(12) United States Patent
Fu et al.

(10) Patent No.: US 11,165,572 B2
(45) Date of Patent: Nov. 2, 2021

(54) TRUSTED MEASURING METHOD, APPARATUS, SYSTEM, STORAGE MEDIUM, AND COMPUTING DEVICE

(71) Applicant: Alibaba Group Holding Limited, Grand Cayman (KY)

(72) Inventors: Yingfang Fu, Beijing (CN); Peng Xiao, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 91 days.

(21) Appl. No.: 16/685,978

(22) Filed: Nov. 15, 2019

(65) Prior Publication Data
US 2020/0177381 A1  Jun. 4, 2020

(30) Foreign Application Priority Data
Nov. 30, 2018 (CN) .......................... 201811457684.2

(51) Int. Cl.
*H04L 9/08* (2006.01)
*H04L 9/32* (2006.01)
*G06F 21/57* (2013.01)

(52) U.S. Cl.
CPC .......... *H04L 9/0877* (2013.01); *G06F 21/575* (2013.01); *H04L 9/321* (2013.01); *G06F 2221/034* (2013.01)

(58) Field of Classification Search
CPC ..... H04L 9/0877; H04L 9/321; H04L 9/3239; H04L 9/3234; H04L 9/0897; H04L 9/08;
(Continued)

(56) References Cited

U.S. PATENT DOCUMENTS

| 7,716,494 B2 | 5/2010 | Liu et al. |
| 8,424,060 B2 | 4/2013 | Xiao et al. |

(Continued)

OTHER PUBLICATIONS

Shen et al., "Trusted Computing Password Support Features and Interface Specifications" ICS35.080 National Standard GB/T29827-2013 Information Security Technology, Nov. 12, 2013.

*Primary Examiner* — Quazi Farooqui
(74) *Attorney, Agent, or Firm* — Lee & Hayes, P.C.

(57) ABSTRACT

A trusted measuring method including: measuring, by a trusted platform control module, itself after being powered on; measuring, by the trusted platform control module, a high-speed encryption/decryption module when the measurement of the trusted platform control module by itself is valid; and measuring, by the trusted platform control module in combination with the high-speed encryption/decryption module, the integrity of a platform and a system when the measurement of the high-speed encryption/decryption module by the trusted platform control module is valid. The measuring process includes: calculating a measurement object by using a predetermined algorithm, comparing the calculation result with a pre-stored verification reference value, and determining that the integrity of the measurement object is not destroyed if the comparison result is consistent. The present disclosure solves the technical problems of low performance of trusted measurement, insensitiveness to attack risks, and information leakage risks in conventional techniques.

20 Claims, 14 Drawing Sheets

(58) Field of Classification Search
CPC ... H04L 9/32; G06F 21/575; G06F 2221/034; G06F 21/602; G06F 21/57
See application file for complete search history.

(56) References Cited

U.S. PATENT DOCUMENTS

| | | |
|---|---|---|
| 10,097,536 B2 | 10/2018 | Wu et al. |
| 10,210,333 B2 | 2/2019 | Smith, II et al. |
| 10,284,375 B2 | 5/2019 | Thom et al. |
| 10,511,610 B2 | 12/2019 | Courbon et al. |
| 10,581,855 B1 * | 3/2020 | Donovan ............... G06Q 20/30 |
| 2005/0283826 A1 | 12/2005 | Tahan |
| 2018/0063092 A1 | 3/2018 | Ollikainen et al. |
| 2018/0337776 A1 * | 11/2018 | Miller ................... H04L 9/3247 |
| 2018/0349610 A1 | 12/2018 | Gupta et al. |

* cited by examiner

MEASUREMENT DATA FOR MEASURING HIGH-SPEED ENCRYPTION/DECRYPTION MODULE IS ACQUIRED BY HIGH-SPEED ENCRYPTION/DECRYPTION MODULE WHEN MEASUREMENT OF TRUSTED PLATFORM CONTROL MODULE IS VALID
S402

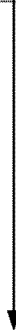

INTEGRITY OF PLATFORM AND SYSTEM IS MEASURED BY HIGH-SPEED ENCRYPTION/DECRYPTION MODULE IN COMBINATION WITH TRUSTED PLATFORM CONTROL MODULE WHEN IT IS DETERMINED BY HIGH-SPEED ENCRYPTION/DECRYPTION MODULE ACCORDING TO MEASUREMENT DATA THAT MEASUREMENT OF THE HIGH-SPEED ENCRYPTION/DECRYPTION MODULE IS VALID, WHEREIN MEASURING PROCESS INCLUDES: CALCULATING MEASUREMENT OBJECT BY USING PREDETERMINED ALGORITHM, COMPARING CALCULATION RESULT WITH PRE-STORED VERIFICATION REFERENCE VALUE, AND DETERMINING THAT INTEGRITY OF MEASUREMENT OBJECT IS NOT DESTROYED IF COMPARISON RESULT IS CONSISTENT
S404

FIG. 4

TRUSTED MEASURING METHOD, APPARATUS, SYSTEM, STORAGE MEDIUM, AND COMPUTING DEVICE

CROSS REFERENCE TO RELATED PATENT APPLICATIONS

This application claims priority to Chinese Patent Application No. 201811457684.2, filed on 30 Nov. 2018 and entitled "TRUSTED MEASURING METHOD, APPARATUS, SYSTEM, STORAGE MEDIUM, AND COMPUTING DEVICE," which is incorporated herein by reference in its entirety.

TECHNICAL FIELD

The present disclosure relates to the field of trusted computing, and, more particularly, to trusted measuring methods, apparatuses, systems, storage media, and computing devices.

BACKGROUND

With the popularity of computer applications, hardware attacks are becoming increasingly rampant, and the integrity assurance of service platforms and systems is increasingly valued. Measurement is a new technology of protecting the integrity of platforms and systems. A target is measured at specific moments to obtain information about the target (such as a hash value of a file), and a value of the information is then compared with a pre-recorded standard value to determine whether the integrity of the target is destroyed.

In conventional techniques, the Trusted Platform Module (TPM) and the Trusted Platform Control Module (TPCM) have shortcomings in the platform and system integrity measurement and the transfer process of trust chain. For example, the computing capability of trusted cards cannot meet static and dynamic measurements of a high-speed operating environment of cloud, leading to delays in risk sensing and prevention. Moreover, in conventional techniques, measurement-related operations are all performed by a central processing unit (CPU), which may have memory leakage of sensitive information, and the CPU has to be unconditionally taken as trusted.

Therefore, in conventional techniques, the trusted measurement has problems of low performance, insensitiveness to attack risks, and information leakage risks.

No effective solution has been proposed yet to solve the above problems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Trusted measuring methods, apparatuses, systems, storage media, and computing devices are provided in example embodiments of the present disclosure, for at least solving the technical problems of the low performance of trusted measurement, the insensitiveness to attack risks, and information leakage risks in conventional techniques.

According to an example embodiment of the present disclosure, a trusted measuring method is provided, including: measuring, by a trusted platform control module, itself after being powered on; measuring, by the trusted platform control module, an encryption and/or decryption ("encryption/decryption") module such as a high-speed encryption/decryption module (the term encryption/description module and the high-speed encryption/decryption may be used interchangeably herein unless specified otherwise) when the measurement of the trusted platform control module by itself is valid; and measuring, by the trusted platform control module in combination with the high-speed encryption/decryption module, the integrity of a platform and a system when the measurement of the encryption/decryption module by the trusted platform control module is valid, wherein the measuring process includes: calculating a measurement object by using a predetermined algorithm, comparing the calculation result with a pre-stored verification reference value, and determining that the integrity of the measurement object is not destroyed if the comparison result is consistent. For example, the encryption/decryption module is a high-speed encryption/decryption module. The terms "encryption/decryption module" and "high-speed encryption/decryption module" are used interchangeably herein unless specified otherwise.

According to an example embodiment of the present disclosure, a trusted measuring method is provided, including: acquiring, by a high-speed encryption/decryption module, measurement data for measuring itself when measurement of a trusted platform control module is valid; and measuring, by the high-speed encryption/decryption module in combination with the trusted platform control module, the integrity of a platform and a system when it is determined by the high-speed encryption/decryption module according to the measurement data that the measurement of itself is valid, wherein the measuring process includes: calculating a measurement object by using a predetermined algorithm, comparing the calculation result with a pre-stored verification reference value, and determining that the integrity of the measurement object is not destroyed if the comparison result is consistent.

According to an example embodiment of the present disclosure, a trusted measuring method is provided, including: powering on a trusted platform control module, and measuring, by the trusted platform control module, itself; measuring, by the trusted platform control module, a high-speed encryption/decryption module when the measurement of the trusted platform control module by itself is valid; and measuring, by the trusted platform control module in combination with the high-speed encryption/decryption module, a baseboard management controller and a basic input/output system when the measurement of the high-speed encryption/decryption module by the trusted platform control module is valid, wherein the measuring process includes: calculating a measurement object by using a predetermined algorithm, comparing the calculation result with a pre-stored verification reference value, and determining that the integrity of the measurement object is not destroyed if the comparison result is consistent.

According to an example embodiment of the present disclosure, a trusted measuring apparatus applied to a trusted platform control module is provided, including: a first measuring module configured to measure the trusted platform control module, after the trusted platform control module is powered on; a second measuring module configured to measure a high-speed encryption/decryption module when the measurement of the trusted platform control module by itself is valid; and a third measuring module configured to measure, by the trusted platform control module in combination with the high-speed encryption/decryption module, the integrity of a platform and a system when the measurement of the high-speed encryption/decryption module by the trusted platform control module is valid, wherein the measuring process includes: calculating a measurement object by using a predetermined algorithm, comparing the calculation result with a pre-stored verification reference value, and determining that the integrity of the measurement object is not destroyed if the comparison result is consistent.

According to an example embodiment of the present disclosure, a trusted measuring apparatus applied to a high-speed encryption/decryption module is provided, including: an acquisition module configured to acquire, when the measurement of a trusted platform control module is valid, measurement data for measuring the trusted platform control module; and a fourth measuring module configured to measure, by the high-speed encryption/decryption module in combination with the trusted platform control module, the integrity of a platform and a system when the high-speed encryption/decryption module determines according to the measurement data that the measurement of itself is valid, wherein the measuring process includes: calculating a measurement object by using a predetermined algorithm, comparing the calculation result with a pre-stored verification reference value, and determining that the integrity of the measurement object is not destroyed if the comparison result is consistent.

According to an example embodiment of the present disclosure, a trusted measuring system is further provided, including a trusted platform control module and a high-speed encryption/decryption module, wherein the trusted platform control module is configured to measure itself after the trusted platform control module is powered on, and measure the high-speed encryption/decryption module when the measurement of the trusted platform control module by itself is valid; and the trusted platform control module and the high-speed encryption/decryption module are configured to jointly measure a baseboard management controller and a basic input/output system when the measurement of the high-speed encryption/decryption module by the trusted platform control module is valid, wherein the measuring process includes: calculating a measurement object by using a predetermined algorithm, comparing the calculation result with a pre-stored verification reference value, and determining that the integrity of the measurement object is not destroyed if the comparison result is consistent.

According to an example embodiment of the present disclosure, a storage medium including a stored program or computer-readable instructions is further provided, wherein a device in which the storage medium is located is controlled during running of the program to perform the trusted measuring method of any of the above items.

According to an example embodiment of the present disclosure, a computing device is further provided, including a memory and a processor, wherein a computer program or computer-readable instructions are stored in the memory; and the processor is configured to execute the computer program stored in the memory, and to perform the trusted measuring method of any of the above items during running of the computer program.

According to an example embodiment of the present disclosure, a data processing method is further provided, including: powering on a target processor; performing a self-test on the target processor to determine that the target processor is in a preset first state; checking, by the target processor, an encryption/decryption processor to determine that the encryption/decryption processor is in a preset second state; and checking, by the target processor and the encryption/decryption processor, the integrity of a platform to determine whether it is in a preset third state, wherein the platform includes an object of firmware.

In the example embodiments of the present disclosure, when measurement of a trusted platform control module and measurement of a high-speed encryption/decryption module both are valid, the integrity of a platform and a system is measured by the trusted platform control module in combination with the high-speed encryption/decryption module. Through the combined measurement of the trusted platform control module and the high-speed encryption/decryption module, not only high performance is achieved due to the high-performance encryption/decryption module, but also the objective of completely trusted risk avoidance is achieved due to the trusted platform control module. Therefore, the technical effects of improving the processing performance of the trusted measurement and avoiding attacks and information leakage risks are achieved, thus solving the technical problems of low performance of trusted measurement, insensitiveness to attack risks, and information leakage risks in conventional techniques.

BRIEF DESCRIPTION OF THE DRAWINGS

The accompanying drawings are used to provide further understanding for the present disclosure and construct a part of this application. The example embodiments of the present disclosure and illustrations thereof are used for explaining the present disclosure, and are not intended to be construed to limit the present disclosure. In the accompanying drawings.

FIG. 4 is a flowchart of a trusted measuring method according to Example embodiment 2 of the present disclosure;

DETAILED DESCRIPTION

Figure 1:
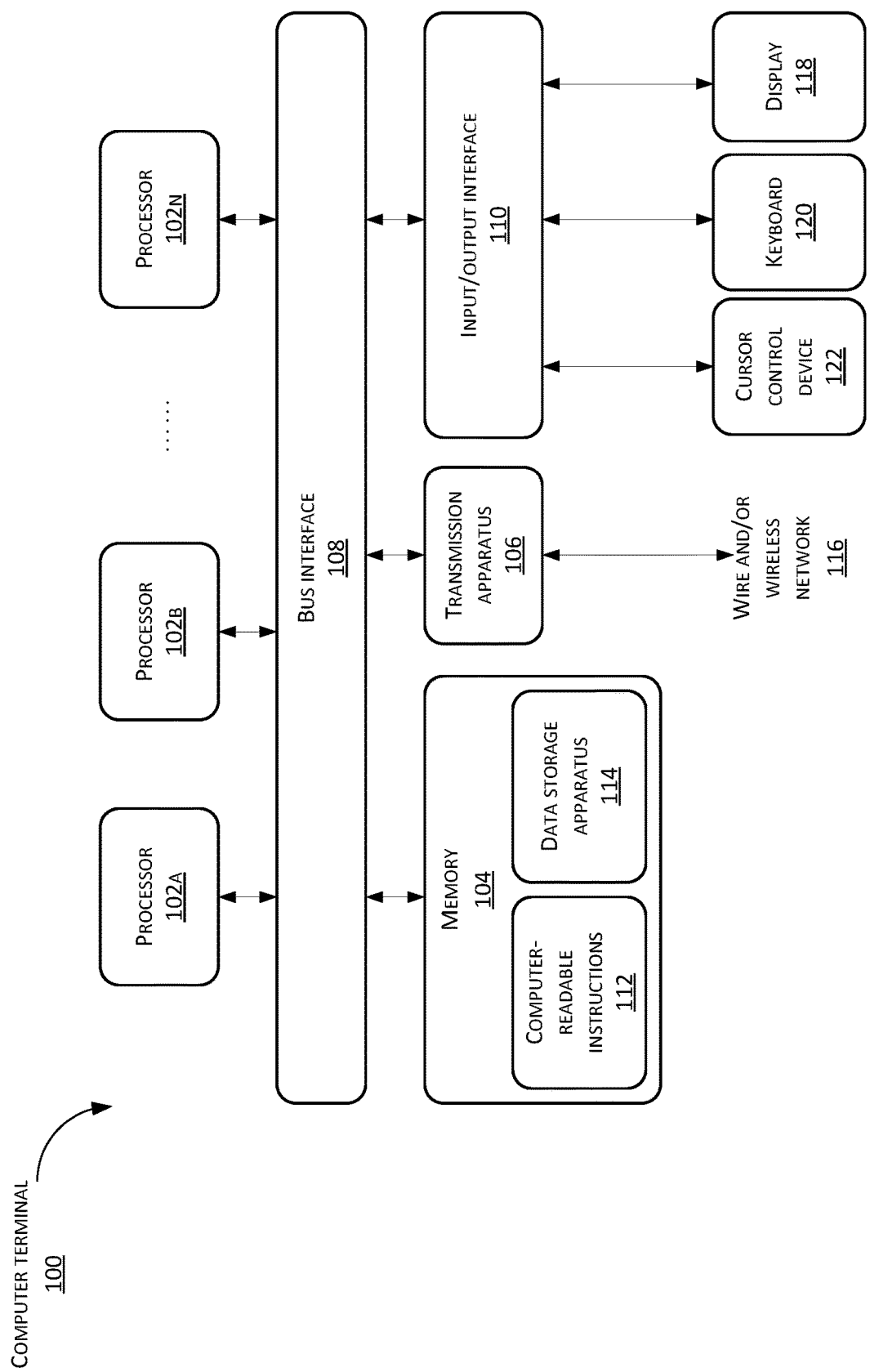
FIG. 1 is a structural block diagram of hardware of a computer terminal (or mobile device) for implementing a trusted measuring method.

To enable those skilled in the art to better understand the solutions of the present disclosure, the technical solutions in the example embodiments of the present disclosure will be described below with reference to the accompanying drawings in the example embodiments of the present disclosure. Apparently, the described example embodiments represent only a part of rather than all the example embodiments of the present disclosure. All other example embodiments derived by those of ordinary skill in the art based on the example embodiments of the present disclosure without creative efforts should fall within the protection scope of the present disclosure.

It should be noted that in the specification, claims and accompanying drawings of the present disclosure, terms such as "first" and "second" are used to distinguish similar objects, but may not necessarily be used to describe a specific order or sequence. It should be understood that data used as such can be exchanged in appropriate cases, and thus the example embodiments of the present disclosure described here can be implemented in an order other than those shown or described here. Moreover, terms "include/comprise" and "have" or any variations thereof intend to cover non-exclusive inclusion. For example, processes, methods, articles or devices including a series of steps or units are not limited to the steps or units clearly listed, but can include other steps or units that are not clearly listed or inherent to the processes, methods, articles or devices.

Firstly, some nouns or terms appearing during description of the example embodiments of this application are applicable to the following explanations.

Trusted Computing (TC): it is a trusted computing platform supported by hardware-based security modules, and is widely used in computing and communication systems, thus improving the overall security of the system.

Trusted Platform Module (TPM)/Trusted Platform Control Module (TPCM): it is a security chip capable of guaranteeing integrity and authenticity of evidence, and is generally forcibly bond to a computing platform physically.

Measurement, or referred to as trusted measurement includes: calculating a measurement object by using a predetermined algorithm, comparing the calculation result with a pre-stored verification reference value, and determining that the integrity of the measurement object is not destroyed if the comparison result is consistent. For example, an actual method of trusted measurement is integrity measurement. The integrity measurement refers to calculating a hash value of a code by using a hash function, and comparing it with a stored hash value to find out whether the code changes. The system makes corresponding judgment according to the comparison result, that is, determines whether the code is destroyed.

Trust chain: the system starting from an initial trust root, and in each conversion of a platform computing environment, maintaining such trust by transferring it, thereby establishes a trust chain on the computing platform, in which one level verifies another level and one level trusts another level.

Baseboard Management Controller (BMC): the BMC can perform some operations such as firmware upgrade and checking machine devices on a machine when the machine is not in a turned-on state.

Basic Input/output System (BIOS): the BIOS implements basic input/output operations through an I/O interface.

Field-Programmable Gate Array (FPGA): the FPGA implements different logic gate functions by changing the connection of logic blocks, and the logic blocks and connection can be changed according to designs, thus achieving editable functions.

Trusted high-speed Data Encryption Card (THSDEC): it is a data encryption card with trusted functions.

Example Embodiment 1

According to an example embodiment of the present disclosure, a method example embodiment of a trusted measuring method is further provided. It should be noted that the steps shown in the flowchart of the accompanying drawings may be executed in a computer system such as a set of computer executable instructions. Although a logical order is shown in the flowchart, in some cases the steps shown or described may be performed in an order different than that described here.

The method example embodiment provided in Example embodiment 1 of this application can be performed in a mobile terminal, a computer terminal or similar computing devices. FIG. 1 shows a block diagram of hardware configuration of a computer terminal (or mobile device) for implementing a method for measurement processing of a cryptographic operation.

As shown in FIG. 1, a computer terminal 100 (such as a mobile device) may include one or more processors (shown as 102a, 102b, . . . , 102n in FIG. 1, wherein n may be any integer) (the processor(s) 102 may include, but is not limited to, a processing apparatus such as a microprocessor (MCU) or a programmable logic device (FPGA)), a memory 104 configured to store data, and a transmission apparatus 106 for communication functions. In addition, the computer terminal 100 may also include: a bus interface 108, an input/output interface (I/O interface) 110. The bus interface 108 transmits data between the processor 102, the memory 104, the transmission apparatus 106, and the input/output interface 110. For example, a universal serial bus (USB) port may be included as one of the ports of the I/O interface 110. The computer terminal 100 may also include a network interface, a power supply and/or a camera (not shown in FIG. 1). It will be understood by those skilled in the art that the structure shown in FIG. 1 is merely illustrative and does not limit the structure of the above electronic device. For example, the computer terminal 100 may also include more or fewer components than those shown in FIG. 1 or have a configuration different from that shown in FIG. 1.

It should be noted that the one or more processors 102 and/or other data processing circuits may generally be referred to as "data processing circuits" in the present disclosure. The data processing circuit may be embodied completely or partially as software, hardware, firmware or any other combination. Moreover, the data processing circuit may be a single, independent determining module, or incorporated completely or partially into any of other elements in the computer terminal 100. As referred to in the example embodiment of the present disclosure, the data processing circuit works as a processor to control, e.g., selection of a variable resistance terminal path connected to the interface.

The memory 104 may be configured to store software programs and modules of application software, such as computer-readable instructions 112 or data storage apparatus 114 corresponding to the trusted measuring method in the example embodiment of the present disclosure. The processor 102 executes the software programs and modules stored in the memory 104, thus performing various functional applications and data processing, that is, implementing the file processing method. The memory 104 may include a high-speed random-access memory and may also include a non-volatile memory, such as one or more magnetic storage apparatuses, a flash memory, or other non-volatile solid-state memories. In some examples, the memory 104 may further include memories placed remote to the processor 102. These remote memories may be connected to the computer terminal 100 over a network. Examples of the network include, but are not limited to, the Internet, an intranet, a local area network, a mobile communication network, and a combination thereof.

The memory 104 is an example of computer readable medium or media.

The computer readable medium includes non-volatile and volatile media as well as movable and non-movable media, and may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

The transmission apparatus 106 is configured to receive or send data via a network. A specific example of the network may include a wire and/or wireless network 116 provided by a communication provider of the computer terminal 100. In one example, the transmission apparatus 106 includes a Network Interface Controller (NIC) that may be connected to other network devices through a base station to communicate with the Internet. In one example, the transmission apparatus 106 may be a Radio Frequency (RF) module for communicating with the Internet wirelessly.

The input/out interface interacts with one or more peripheral device such as a display 118, a keyboard 120, and a cursor control device 122 such as a mouse.

The display 118 may be, for example, a touch screen-type liquid crystal display (LCD) that allows a user to interact with a user interface of the computer terminal 100.

Figure 2:
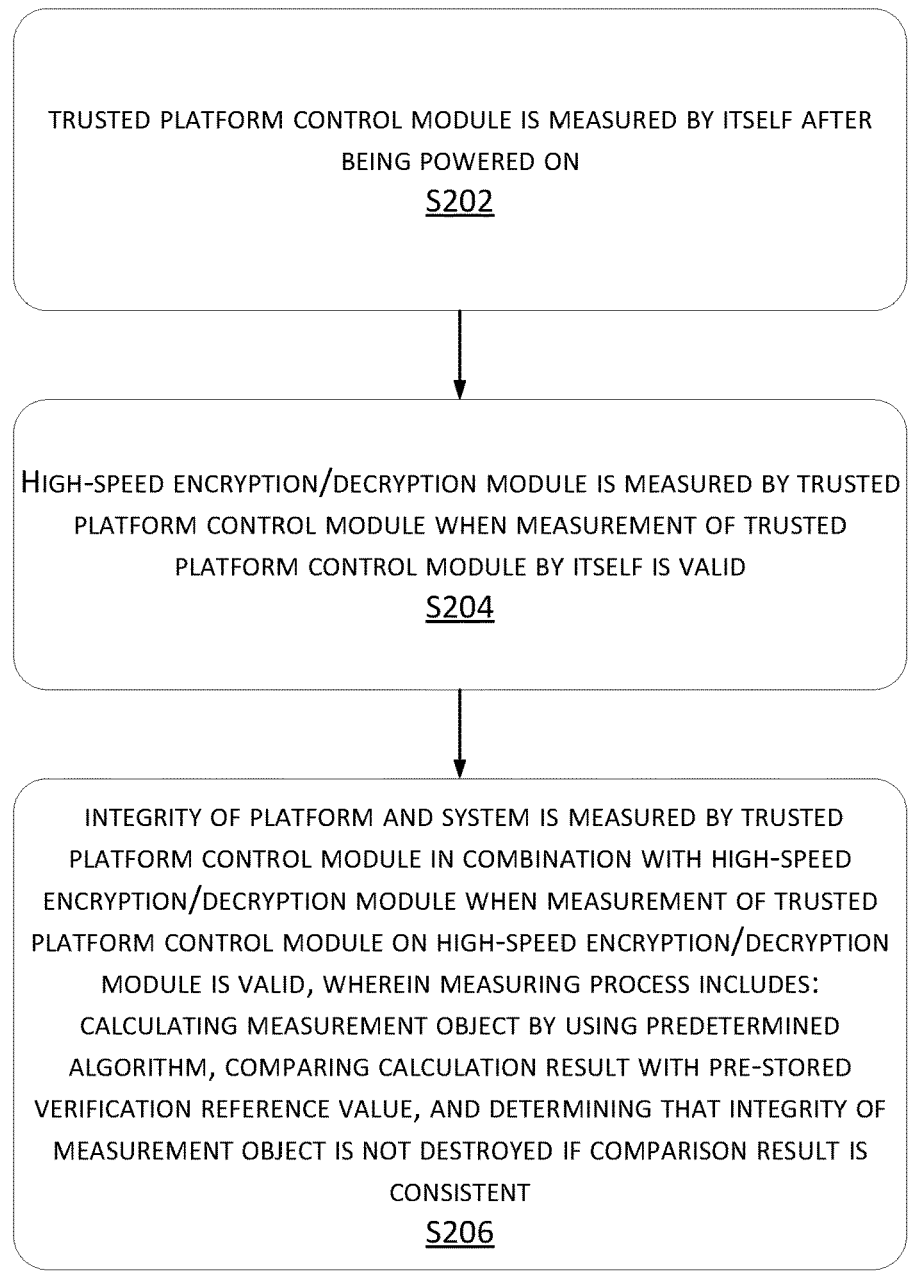
FIG. 2 is a flowchart of a trusted measuring method according to Example embodiment 1 of the present disclosure.

In the above operating environment, a trusted measuring method as shown in FIG. 2 is provided in this application. FIG. 2 is a flowchart of a trusted measuring method according to Example embodiment 1 of the present disclosure. As shown in FIG. 2, the process can include the following steps.

In step S202, a trusted platform control module is self-measured after being powered on.

In step S204, a high-speed encryption/decryption module is measured by the trusted platform control module when the measurement of the trusted platform control module by itself is valid.

In step S206, the integrity of a platform and a system is measured by the trusted platform control module in combination with the high-speed encryption/decryption module when the measurement of the high-speed encryption/decryption module by the trusted platform control module is valid, wherein the measuring process includes: calculating a measurement object by using a predetermined algorithm, comparing the calculation result with a pre-stored verification reference value, and determining that the integrity of the measurement object is not destroyed if the comparison result is consistent.

By using the above steps, when measurement of a trusted platform control module and measurement of a high-speed encryption/decryption module both are valid, the integrity of a platform and a system is measured by the trusted platform control module in combination with the high-speed encryption/decryption module. Through the combined measurement of the trusted platform control module and the high-speed encryption/decryption module, not only can achieve high performance due to the high-performance encryption/decryption module, but also can achieve the objective of completely trusted risk avoidance due to the trusted platform control module. Therefore, the technical effects of improving the processing performance of the trusted measurement and avoiding attacks and information leakage risks are achieved, thus solving the technical problems of low performance of trusted measurement, insensitiveness to attack risks, and information leakage risks in conventional techniques.

In conventional techniques, the transfer of the trust chain mainly includes two types of technical routes, one is the TPCM in China and the other is TPM of the international TCG standard organization. There are some shortcomings respectively in these two routes. The shortcomings of the two routes below illustrate the superiority brought by the transfer of the trust chain of the trusted measurement provided by this application.

Figure 3:
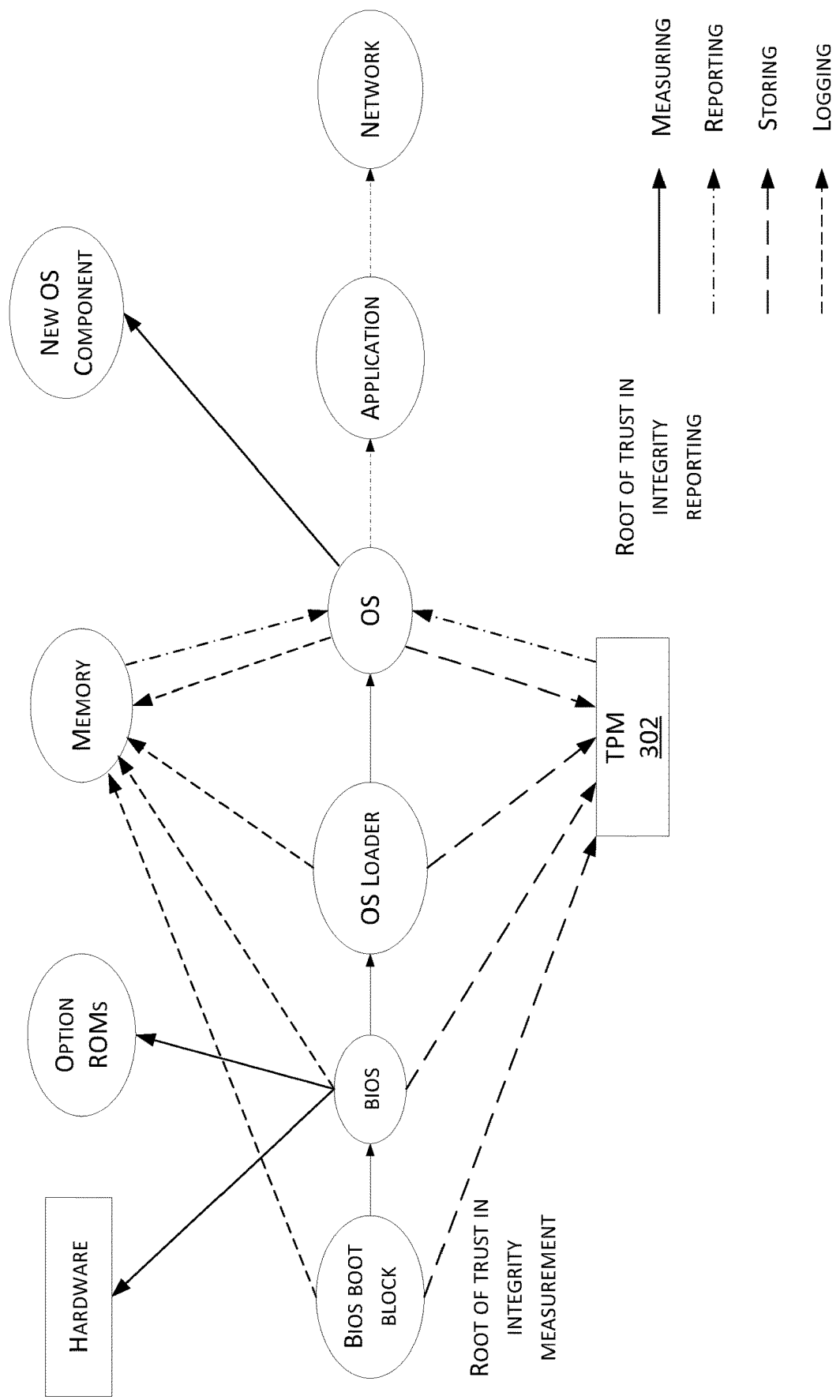
FIG. 3 is a schematic diagram of transfer of a TPM trust chain as a contrast according to an example embodiment of the present disclosure.

Transfer of TPM trust chain:

FIG. 3 is a schematic diagram of transfer of a TPM trust chain as a contrast according to an example embodiment of the present disclosure. As shown in FIG. 3, the TPM 302 in the TCG specification is a hardware trusted root of a trusted computing platform, and the TPM 302 is a secure chip providing protected secure storage and password computing capability. The TPM is physically connected to the computing platform and connected to the CPU through an external bus, for example, it is directly burned on a motherboard on a PC platform and connected via an LPC bus.

The definition of trusted is given in the TCG specification that: an entity that always runs for a specific target in a predictable way. A core mechanism of trusted computing is building a trusted computing environment through a trust chain mechanism. Whether a running entity is trusted or not is based on whether a previous running process of the system is trusted. Based on this trust relationship, the system starting from an initial trust root, in each conversion of a platform computing environment, maintaining the trust by transferring it, thereby establishes a trust chain on the computing platform, in which one level verifies another level and one level trusts another level. If the computing environment is always trusted, it can be trusted by a local user or a remote entity.

In the TCG standard, a measurement value PCRi of each item is stored in the memory, and an extended value of the measurement value is stored in the TPM, wherein PCRi New=HASH (PCRi Old value||value to add).

Considering the performance problem, the common practice in the industry is placing the hash in the CPU. The TPM is only responsible for measurement and does not perform comparison. After measurements on all measurement objects are completed, in an OS Grub phase, a local host CPU performs the comparison, or when the host accesses a server, the server performs the comparison.

However, this method of performing comparison finally by the CPU or the server after all objects are measured will lead to sensitive information leakage and delays in risk sensing and prevention.

Transfer of TPCM Trust Chain

The example embodiment of the present disclosure also provides transfer of the TPCM trust chain as a contrast, and the transfer of the trust chain includes the following steps.

1) The TPCM is powered on, a self-test is performed by the TPCM to check whether free firmware is valid, and step 2) is performed if it is valid; otherwise, it is shut down or an alarm is sent.

2) A BMC and a BIOS are verified, and step 3) is performed if the verification succeeds; otherwise, it is shut down or an alarm is sent.

3) A motherboard is powered on.

4) The integrity of a platform is verified.

a) A CPU is required by the BIOS to obtain platform information and return it to the TPCM.

b) Firmware information of a network card, a graphics card, a hard disk, and the like is acquired by the CPU.

c) The obtained information is returned by the CPU to the TPCM for the TPCM to measure.

d) The integrity of the relevant firmware is verified by the TPCM by measurement; and step 5) is performed if the verification succeeds; otherwise, it is shut down or an alarm is sent.

5) An OS loader is verified, and step 5) is performed if the verification succeeds; otherwise, it is shut down or an alarm is sent.

6) An OS Kernel is verified, and step 6) is performed if the verification succeeds; otherwise, it is shut down or an alarm is sent.

7) A vTPCM is measured and verified dynamically.

8) An application system is measured and verified dynamically.

In the process of transfer of the trust chain, the hash value calculation and verification of all the measurement objects in steps 1) to 4) are performed in the TPCM card, and this will cause delays in risk sensing and prevention due to the insufficient computing capability of the TPCM card. After step 5), the hash calculation and verification of all the measurement objects are performed in the CPU, which will cause leakage of sensitive information.

Therefore, the following shortcomings exist in the above transfer processes of the trust chain as a contrast: the computing capability of the trusted cards cannot meet the static and dynamic measurement of the high-speed operating environment of cloud, leading to the delays in risk sensing and prevention. The measurement-related operations are completed by the CPU, which will cause memory leakage of sensitive information, and the CPU has to be unconditionally taken as trusted.

The trusted measuring method provided by the example embodiments of the present disclosure can not only improve the measurement performance, but also can sense and prevent risks in real time.

It should be noted that the above trusted measuring method may be performed by a trusted platform control module, and the trusted platform control module implements trusted measurement.

As an example embodiment, the trusted platform control module and the high-speed encryption/decryption module respectively represent functional entities having corresponding functions. For example, the trusted platform control module is an entity having a trusted function, which may be a single hardware chip entity or a functional entity integrated on another chip. The high-speed encryption/decryption module is an entity having a high-speed encryption/decryption function, which may be a single hardware chip entity or a functional entity integrated on another chip. The trusted platform control module and the high-speed encryption/decryption module may exist separately or may exist in a form of being integrated on one chip.

As an example embodiment, the trusted platform control module is self-measured after being powered on. That is, in order to improve the measurement performance, the trusted platform control module starts the measurement on itself upon power-on. It should be noted that the measurement of the trusted platform control module also needs to obtain data for measuring itself. To acquire the data for the measurement, the data can be obtained by the trusted platform control module itself, or can be obtained by a high-performance high-speed encryption/decryption module. Afterwards, regardless of the acquisition method, the trusted platform control module is self-measured when acquiring the data for the measurement to obtain a measurement result. The obtained measurement result is compared with a standard value of the measurement result of the trusted platform control module by the trusted platform control module to obtain the comparison result. When the comparison result is consistent, i.e., the measurement result is consistent with the verification reference value, it is determined that the trusted platform control module is trusted, i.e., valid and secure.

As an example embodiment, the high-speed encryption/decryption module is measured by the trusted platform control module when the measurement of the trusted platform control module by itself is valid. When the high-speed encryption/decryption module is measured by the trusted platform control module, different measuring methods may be used according to different data acquisition methods. For example, the measuring, by the trusted platform control module, the high-speed encryption/decryption module may include: receiving, by the trusted platform control module, measurement data sent by the high-speed encryption/decryption module for measuring the high-speed encryption/decryption module, or acquiring, by the trusted platform control module itself, measurement data for measuring the high-speed encryption/decryption module; afterwards, measuring, by the trusted platform control module, the high-speed encryption/decryption module according to the measurement data for measuring the high-speed encryption/decryption module, and obtaining a measurement result; then, comparing, by the trusted platform control module, the measurement result with a verification reference value, and determining that the high-speed encryption/decryption module is valid if the comparison result is consistent.

As shown from the above processing, the measurement data of the high-speed encryption/decryption module used by the trusted platform control module for measuring the high-speed encryption/decryption module can be collected by the high-speed encryption/decryption module and sent to the trusted platform control module, or can be acquired by the trusted platform control module itself. Due to the high performance characteristic of the high-speed encryption/decryption module, acquisition by the high-speed encryption/decryption module can improve the measurement performance to some extent.

It should be noted that in this example embodiment, when the high-speed encryption/decryption module is measured by the trusted platform control module, the high-speed encryption/decryption module is measured by the trusted platform control module according to the measurement data of the high-speed encryption/decryption module to obtain the measurement result, and the measurement result is compared with the verification reference value to determine whether the high-speed encryption/decryption module is valid. Of course, when the measurement data for measurement is acquired by the high-speed encryption/decryption module, the high-speed encryption/decryption module can also be measured directly by itself according to the measurement data to obtain a measurement result, and then send the obtained measurement result to the trusted platform control module. The trusted platform control module compares the received measurement result with the verification reference value to determine whether the high-speed encryption/decryption module is valid. Whether the measurement and comparison are implemented by the trusted platform control module, or the measurement is performed by the high-speed encryption/decryption module and the comparison is then performed by the trusted platform control module, both methods can implement the measurement of the high-speed encryption/decryption module by the trusted platform control module, and determine whether the high-speed encryption/decryption module is valid. The above two methods can be flexibly selected as needed.

As an example embodiment, if the high-speed encryption/decryption module is measured by the trusted platform control module as valid, when the integrity of the platform and the system is measured by the trusted platform control module in combination with the high-speed encryption/decryption module, the integrity of the platform and system may be measured in a variety of manners.

When a measurement object is measured, the following steps are generally included: acquiring measurement data; performing a measurement operation to obtain a measurement result; and comparing the measurement result with a verification reference value to determine whether the measurement object is valid. The measurement is performed by the trusted platform control module in combination with the high-speed encryption/decryption module, and the above steps can be implemented by both the trusted platform control module and the high-speed encryption/decryption module. Therefore, when the above steps are performed correspondingly by the trusted platform control module and the high-speed encryption/decryption module respectively, there are at least eight solutions of performing the measurement by the trusted platform control module in combination with the high-speed encryption/decryption module. The implementation processes are basically the same, and thus only some example implementations are described in the example embodiment of the present disclosure.

In an example implementation, the measuring, by the trusted platform control module in combination with the high-speed encryption/decryption module, the integrity of a platform and a system may include: determining, by the trusted platform control module, a measurement object to be measured in the platform and the system; receiving, by the trusted platform control module, a measurement result sent by the high-speed encryption/decryption module, wherein the measurement result is obtained by measuring the measurement object by the high-speed encryption/decryption module according to measurement data of the measurement object after the measurement data is acquired; and comparing, by the trusted platform control module, the measurement result with a verification reference value to obtain a comparison result, and determining that the measurement object is valid if the comparison result is consistent.

It should be noted that in the example implementation, the measurement object to be measured in the platform and the system, which is determined by the trusted platform control module, may include at least one of the following: a baseboard management controller, a basic input/output system, an operating system loader, an operating system kernel, a virtual trusted platform control module, and an application system. The multiple measurement objects may be separately measured, or may be measured in a certain measurement order. For example, the measurement may be performed according to an establishment order of the trust chain.

In an example embodiment, the above platform and system is a collective term that includes the entire hardware, firmware, and software. For example, the platform may include some hardware entities such as a graphics card, a storage device, and a memory. The system may include some software objects, for example, some system software, some application software, and the like.

In the example implementation, the measurement data of the measurement object is obtained by the high-speed encryption/decryption module; the measurement object is measured by the high-speed encryption/decryption module according to the measurement data to obtain the measurement result, and the measurement result is sent to the trusted platform control module; and the trusted platform control module compares the received measurement result with the verification reference value to determine whether the measurement object is valid. In the example implementation, data acquisition and measurement calculation are performed by the high-speed encryption/decryption module, which can greatly improve the measurement performance.

In another example implementation, the measuring, by the trusted platform control module in combination with the high-speed encryption/decryption module, the integrity of a platform and a system may include: determining, by the trusted platform control module, a measurement object to be measured in the platform and the system; receiving, by the trusted platform control module, the comparison result sent by the high-speed encryption/decryption module, wherein the comparison result is obtained by measuring the measurement object by the high-speed encryption/decryption module according to measurement data of the measurement object upon acquisition of the measurement data to obtain a measurement result, and comparing the measurement result with the verification reference value; and determining, by the trusted platform control module, that the measurement object is valid if the comparison result is consistent.

It should be noted that in the example implementation, the measurement object to be measured in the platform and the system, which is determined by the trusted platform control module, may include at least one of the following: a baseboard management controller, a basic input/output system, an operating system loader, an operating system kernel, a virtual trusted platform control module, and an application system. The multiple measurement objects may be separately measured, or may be measured in a certain measurement order. For example, the measurement may be performed according to an establishment order of the trust chain.

In the example implementation, the measurement data of the measurement object is obtained by the high-speed encryption/decryption module; the measurement object is measured by the high-speed encryption/decryption module according to the measurement data to obtain the measurement result, and the measurement result is then compared with the verification reference value to obtain a comparison result, thus determining whether the measurement object is valid. In this example implementation, data acquisition, measurement calculation, and the final comparison are performed by the high-speed encryption/decryption module, which further improves the measurement performance.

In another example implementation, the measuring, by the trusted platform control module in combination with the high-speed encryption/decryption module, the integrity of a platform and a system may include: determining, by the trusted platform control module, a measurement object to be measured in the platform and the system; acquiring, by the trusted platform control module, measurement data of the measurement object, and sending the measurement data to the high-speed encryption/decryption module; receiving, by the trusted platform control module, a measurement result sent by the high-speed encryption/decryption module, wherein the measurement result is obtained by measuring the measurement object by the high-speed encryption/decryption module according to measurement data sent by the trusted platform control module; and comparing, by the trusted platform control module, the measurement result with a verification reference value to obtain a comparison result, and determining that the measurement object is valid if the comparison result is consistent.

It should be noted that in the example implementation, the measurement object to be measured in the platform and the system, which is determined by the trusted platform control module, may include at least one of the following: a baseboard management controller, a basic input/output system, an operating system loader, an operating system kernel, a virtual trusted platform control module, and an application system. The multiple measurement objects may be separately measured, or may be measured in a certain measurement order. For example, the measurement may be performed according to an establishment order of the trust chain.

In the example implementation, the measurement data of the measurement object is obtained by the trusted platform control module, and the measurement data is sent to the high-speed encryption/decryption module; the measurement object is measured by the high-speed encryption/decryption module according to the measurement data sent by the trusted platform control module to obtain the measurement result, and the measurement result is sent to the trusted platform control module; and the trusted platform control module compares the measurement result with the verification reference value to obtain a comparison result, and determines whether the measurement object is valid. In this example implementation, the measurement data is obtained by the trusted platform control module and sent to the high-speed encryption/decryption module, the measurement calculation is performed by the high-speed encryption/decryption module to obtain the measurement result, the measurement result is sent to the trusted platform control module, and finally, the final comparison is performed by the trusted platform control module, which not only improves the measurement performance by performing the measurement calculation by the high-speed encryption/decryption module, but also ensures the diversity of the data source by acquiring the data by the trusted platform control module, which can be selected flexibly.

Through the various example embodiments and example implementations above, starting from the trusted platform control module, not only the technical effects of improving the processing performance of the trusted measurement and avoiding attacks and information leakage risks can be achieved, but also the technical problems of low performance of the trusted measurement, insensitiveness to attack risks, and information leakage risks in conventional techniques can be solved.

It should be noted that for the sake of simple description, the above method example embodiments are all expressed as a series of action combinations, but those skilled in the art should understand that the present disclosure is not limited by the described action sequence, because certain steps may be performed in other sequences or concurrently according to the present disclosure. Next, those skilled in the art should also understand that the example embodiments described in the specification are all example embodiments, and the actions and modules involved are not necessarily mandatory for the present disclosure.

Through the description of the above example embodiments, those skilled in the art can clearly understand that the method according to the above example embodiment can be implemented by means of software plus a necessary general hardware platform, and can also be implemented by hardware, but the former is the better implementation in many cases. Based on such understanding, the technical solution of the present disclosure essentially or the parts contributing to the prior art may be embodied in the form of a software product. The computer software product is stored in a storage medium (such as a ROM/RAM, a magnetic disk, and an optical disc) including several instructions for enabling a terminal device (which may be a mobile phone, a computer, a server, a network device, or the like) to perform the methods described in various example embodiments of the present disclosure.

Example Embodiment 2

A trusted measuring method as shown in FIG. 4 is provided in this application. FIG. 4 is a flowchart of a trusted measuring method according to Example embodiment 2 of the present disclosure. As shown in FIG. 4, the process includes the following steps.

In step S402, measurement data for measuring a high-speed encryption/decryption module is acquired by the high-speed encryption/decryption module when measurement of a trusted platform control module is valid.

In step S404, the integrity of a platform and a system is measured by the high-speed encryption/decryption module in combination with the trusted platform control module when it is determined by the high-speed encryption/decryption module according to the measurement data that the measurement of the high-speed encryption/decryption module is valid, wherein the measuring process includes: calculating a measurement object by using a predetermined algorithm, comparing the calculation result with a pre-stored verification reference value, and determining that the integrity of the measurement object is not destroyed if the comparison result is consistent.

By using the above steps, when measurement of a trusted platform control module and measurement of a high-speed encryption/decryption module both are valid, the integrity of a platform and a system is measured by the high-speed encryption/decryption module in combination with the trusted platform control module. Through the combined measurement of the high-speed encryption/decryption module and the trusted platform control module, not only high performance can be achieved due to the high-performance encryption/decryption module, but also the objective of completely trusted risk avoidance can be achieved due to the trusted platform control module. Therefore, the technical effects of improving the processing performance of the trusted measurement and avoiding attacks and information leakage risks are achieved, thus solving the technical problems of low performance of trusted measurement, insensitiveness to attack risks, and information leakage risks in conventional techniques.

As an example embodiment, when the measurement of the trusted platform control module is valid, the measurement data for measuring itself is acquired by the high-speed encryption/decryption module. The measurement data may be acquired directly by the high-speed encryption/decryption module, or may be acquired indirectly through other devices. For example, the measurement data is acquired by the trusted platform control module and then sent to the high-speed encryption/decryption module.

As an example embodiment, before it is determined by the high-speed encryption/decryption module according to the measurement data that the measurement of itself is valid, the high-speed encryption and decryption module may be measured in various manners. For example, the measurement may be performed by the trusted platform control module to obtain the measurement result, the measurement result is compared with the verification reference value, then the comparison result is sent to the high-speed encryption/decryption module, and it is determined by the high-speed encryption/decryption module according to the comparison result whether it is valid. It is also possible by the high-speed encryption and decryption module, the high-speed encryption and decryption module is measured according to the obtained measurement data to obtain the measurement result, the measurement result is compared with the verification reference value, and it is confirmed according to the comparison result whether the high-speed encryption and decryption module is valid.

For example, the determination by the high-speed encryption/decryption module according to the measurement data that its measurement thereof is valid may include: feeding, by the high-speed encryption/decryption module, measurement result obtained after measuring itself according to the measurement data back to the trusted platform control module; and determining, by the high-speed encryption/decryption module, that the measurement of itself is valid if the received measurement result fed back by the trusted platform control module is consistent with the verification reference value. That is, the high-speed encryption/decryption module is self-measured according to the measurement data, and the measurement result is sent to the trusted platform control module for comparison, which not only meets the requirement of the high-performance measurement, but also determines whether it is valid according to the comparison result fed back by the trusted platform control module, so that the determination of whether it is valid is more accurate.

Correspondingly, when the measurement object is measured, the following steps are generally included: acquiring the measurement data; performing the measurement operation to obtain the measurement result; and comparing the measurement result with the verification reference value to determine whether the measurement object is valid. The measurement is performed by the trusted platform control module in combination with the high-speed encryption/decryption module, and the above steps can be implemented by both the trusted platform control module and the high-speed encryption/decryption module. Therefore, when the above steps are performed correspondingly by the trusted platform control module and the high-speed encryption/decryption module respectively, there are at least eight solutions of performing the measurement by the trusted platform control module in combination with the high-speed encryption/decryption module. The implementation process is basically the same, and thus only some example implementations are described in the example embodiment of the present disclosure.

In an example implementation, the measuring, by the high-speed encryption/decryption module in combination with the trusted platform control module, the integrity of a platform and a system may include: determining, by the high-speed encryption/decryption module, a measurement object to be measured in the platform and the system; acquiring, by the high-speed encryption/decryption module, measurement data of the measurement object, measuring the measurement object according to the measurement data to obtain a measurement result, and sending the measurement result to the trusted platform control module, wherein the measurement result is used by the trusted platform control module to be compared with the verification reference value to obtain a comparison result, and it is determined that the measurement object is valid if the comparison result is consistent.

It should be noted that in the example implementation, the measurement object to be measured in the platform and the system, which is determined by the high-speed encryption/decryption module, may include at least one of the following: a baseboard management controller, a basic input/output system, an operating system loader, an operating system kernel, a virtual trusted platform control module, and an application system. The multiple measurement objects may be separately measured, or may be measured in a certain measurement order. For example, the measurement may be performed according to an establishment order of the trust chain. In addition, in the example implementation, data acquisition and measurement calculation are performed by the high-speed encryption/decryption module, which can greatly improve the measurement performance.

In an example implementation, the measuring, by the high-speed encryption/decryption module in combination with the trusted platform control module, the integrity of a platform and a system may include: determining, by the high-speed encryption/decryption module, a measurement object to be measured in the platform and the system; acquiring, by the high-speed encryption/decryption module, measurement data of the measurement object, measuring the measurement object according to the measurement data to obtain a measurement result, comparing the measurement result with the verification reference value to obtain a comparison result, and sending the comparison result to the trusted platform control module, wherein it is determined that the measurement object is valid if the comparison result is consistent.

It should be noted that in the example implementation, the measurement object to be measured in the platform and the system, which is determined by the high-speed encryption/decryption module, may include at least one of the following: a baseboard management controller, a basic input/ output system, an operating system loader, an operating system kernel, a virtual trusted platform control module, and an application system. The multiple measurement objects may be separately measured, or may be measured in a certain measurement order. For example, the measurement may be performed according to an establishment order of the trust chain. In addition, in this example implementation, data acquisition, measurement calculation, and the final comparison are performed by the high-speed encryption/decryption module, which further improves the measurement performance.

In another example implementation, the measuring, by the high-speed encryption/decryption module in combination with the trusted platform control module, the integrity of a platform and a system includes: determining, by the high-speed encryption/decryption module, a measurement object to be measured in the platform and the system; receiving, by the high-speed encryption/decryption module, measurement data sent by the trusted platform control module for measuring the measurement object; measuring, by the high-speed encryption/decryption module, the measurement object according to the measurement data to obtain a measurement result, and sending the measurement result to the trusted platform control module, wherein the measurement result is used by the trusted platform control module to be compared with the verification reference value to obtain a comparison result, and it is determined that the measurement object is valid if the comparison result is consistent.

It should be noted that in the example implementation, the measurement object to be measured in the platform and the system, which is determined by the high-speed encryption/decryption module, may include at least one of the following: a baseboard management controller, a basic input/output system, an operating system loader, an operating system kernel, a virtual trusted platform control module, and an application system. The multiple measurement objects may be separately measured, or may be measured in a certain measurement order. For example, the measurement may be performed according to an establishment order of the trust chain. In addition, in this example implementation, the measurement data is obtained by the trusted platform control module and sent to the high-speed encryption/decryption module, and the measurement calculation is performed by the high-speed encryption/decryption module to obtain the measurement result, the measurement result is sent to the trusted platform control module, and finally, the final comparison is performed by the trusted platform control module, which not only improves the measurement performance by performing the measurement calculation by the high-speed encryption/decryption module, but also ensures the diversity of the data source by acquiring the data by the trusted platform control module, which can be selected flexibly.

Through the various example embodiments and example implementations above, starting from the high-speed encryption card, the technical effects of improving the processing performance of the trusted measurement and avoiding attacks and information leakage risks are achieved, thus solving the technical problems of low performance of the trusted measurement, insensitiveness to attack risks, and information leakage risks in conventional techniques.

Example Embodiment 3

Figure 5:
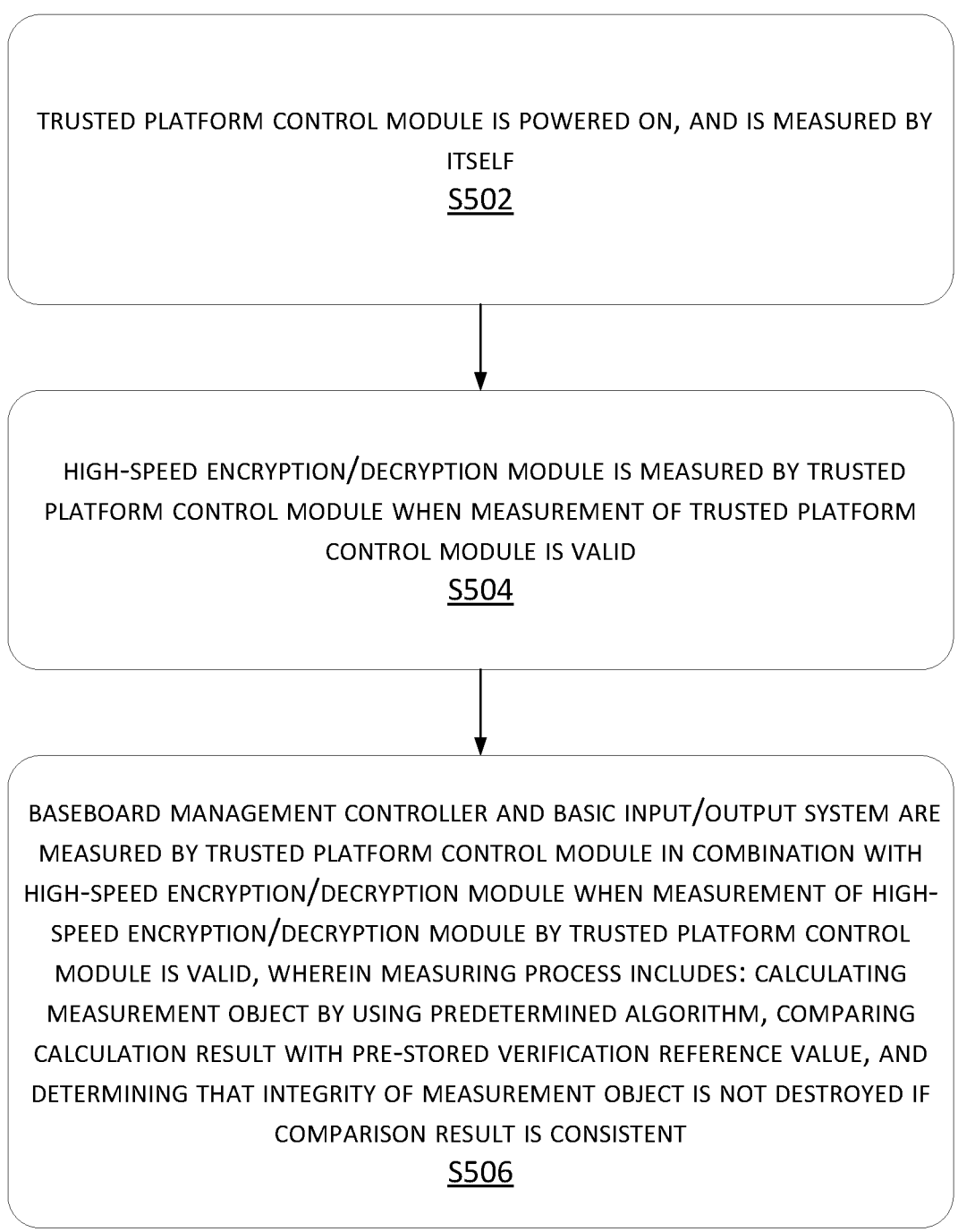
FIG. 5 is a flowchart of a trusted measuring method according to Example embodiment 3 of the present disclosure.

A trusted measuring method as shown in FIG. 5 is provided in this application. FIG. 5 is a flowchart of a trusted measuring method according to Example embodiment 3 of the present disclosure. As shown in FIG. 5, the process includes the following steps.

In step S502, a trusted platform control module is powered on, and is self-measured.

In step S504, a high-speed encryption/decryption module is measured by the trusted platform control module when the measurement of the trusted platform control module is valid.

In step S506, a baseboard management controller and a basic input/output system are measured by the trusted platform control module in combination with the high-speed encryption/decryption module when the measurement of the high-speed encryption/decryption module by the trusted platform control module is valid, wherein the measuring process includes: calculating a measurement object by using a predetermined algorithm, comparing the calculation result with a pre-stored verification reference value, and determining that the integrity of the measurement object is not destroyed if the comparison result is consistent.

By using the above steps, when measurement of a trusted platform control module and measurement of a high-speed encryption/decryption module both are valid, a baseboard management controller and a basic input/output system in a complete trust chain of the trusted high-speed encryption card are measured by the trusted platform control module in combination with the high-speed encryption/decryption module. Through the combined measurement of the trusted platform control module and the high-speed encryption/decryption module, not only high performance can be achieved due to the high-performance encryption/decryption module, but also the objective of completely trusted risk avoidance can be achieved due to the trusted platform control module. Therefore, the technical effects of improving the processing performance of the trusted measurement and avoiding attacks and information leakage risks are achieved, thus solving the technical problems of low performance of trusted measurement, insensitiveness to attack risks, and information leakage risks in conventional techniques.

In an example embodiment, the measuring, by the trusted platform control module in combination with the high-speed encryption/decryption module, a baseboard management controller and a basic input/output system may include: acquiring, by the trusted platform control module, measurement data for measuring the baseboard management controller and the basic input/output system; sending the acquired measurement data to the high-speed encryption/decryption module; measuring, by the high-speed encryption/decryption module, the measurement data to obtain a measurement result, and sending the measurement result to the trusted platform control module; and comparing, by the trusted platform control module, the measurement result with the verification reference value to obtain a comparison result, and determining that the baseboard management controller and the basic input/output system are valid when the comparison result is consistent.

By adopting the above processing manner, the measurement data of the baseboard management controller and the basic input/output system is obtained by the trusted platform control module, the measurement data is measured by the high-speed encryption/decryption module to obtain the measurement result, and the measurement result is compared with the verification reference value by the trusted platform control module; as such, the trusted platform control module is combined with the high-speed encryption/decryption module to implement the measurement of the baseboard management controller and the basic input/output system, which is not only safe but also highly efficient.

In an example embodiment, after the baseboard management controller and the basic input/output system are measured jointly by the trusted platform control module in combination with the high-speed encryption/decryption module, an operating system platform is measured by the trusted platform control module in combination with the high-speed encryption/decryption module, wherein the measuring, by the trusted platform control module in combination with the high-speed encryption/decryption module, an operating system platform may include: acquiring, by the trusted platform control module, measurement data of the operating system platform, and sending the measurement data of the operating system platform to the high-speed encryption/decryption module; measuring, by the high-speed encryption/decryption module, the operating system platform according to the measurement data of the operating system platform to obtain a measurement result, and sending the measurement result to the trusted platform control module; and comparing, by the trusted platform control module, the measurement result with the verification reference value to obtain a comparison result, and determining that the operating system platform is valid if the comparison result is consistent.

In another example embodiment, after the operating system platform is measured by the trusted platform control module in combination with the high-speed encryption/decryption module, the following measurement objects included in complete the trust chain of the trusted high-speed encryption card are measured sequentially by the trusted platform control module in combination with the high-speed encryption/decryption module: an operating system loader, an operating system kernel, a virtual trusted platform control module, and an application system, wherein at least one of the above measurement objects included in the complete trust chain of the trusted high-speed encryption card is measured by the trusted platform control module in combination with the high-speed encryption/decryption module in the following manner: acquiring, by the trusted platform control module, measurement data of the measurement, and sending the measurement data of the measurement object to the high-speed encryption/decryption module; measuring, by the high-speed encryption/decryption module, the measurement object according to the measurement data of the measurement object to obtain a measurement result, and sending the measurement result to the trusted platform control module; and comparing, by the trusted platform control module, the measurement result with the verification reference value to obtain a comparison result, and determining that the measurement object is valid if the comparison result is consistent.

The measurement of the complete trust chain of the trusted high-speed encryption card is illustrated below with reference to a specific implementation.

The trusted high-speed encryption card THSDC implements a platform trusted boot function before booting to loading of the operating system kernel; the computing security for encrypting/decrypting service sensitive data; and the interaction between the two devices, for ensuring the validity of each platform and identity.

Figure 6:
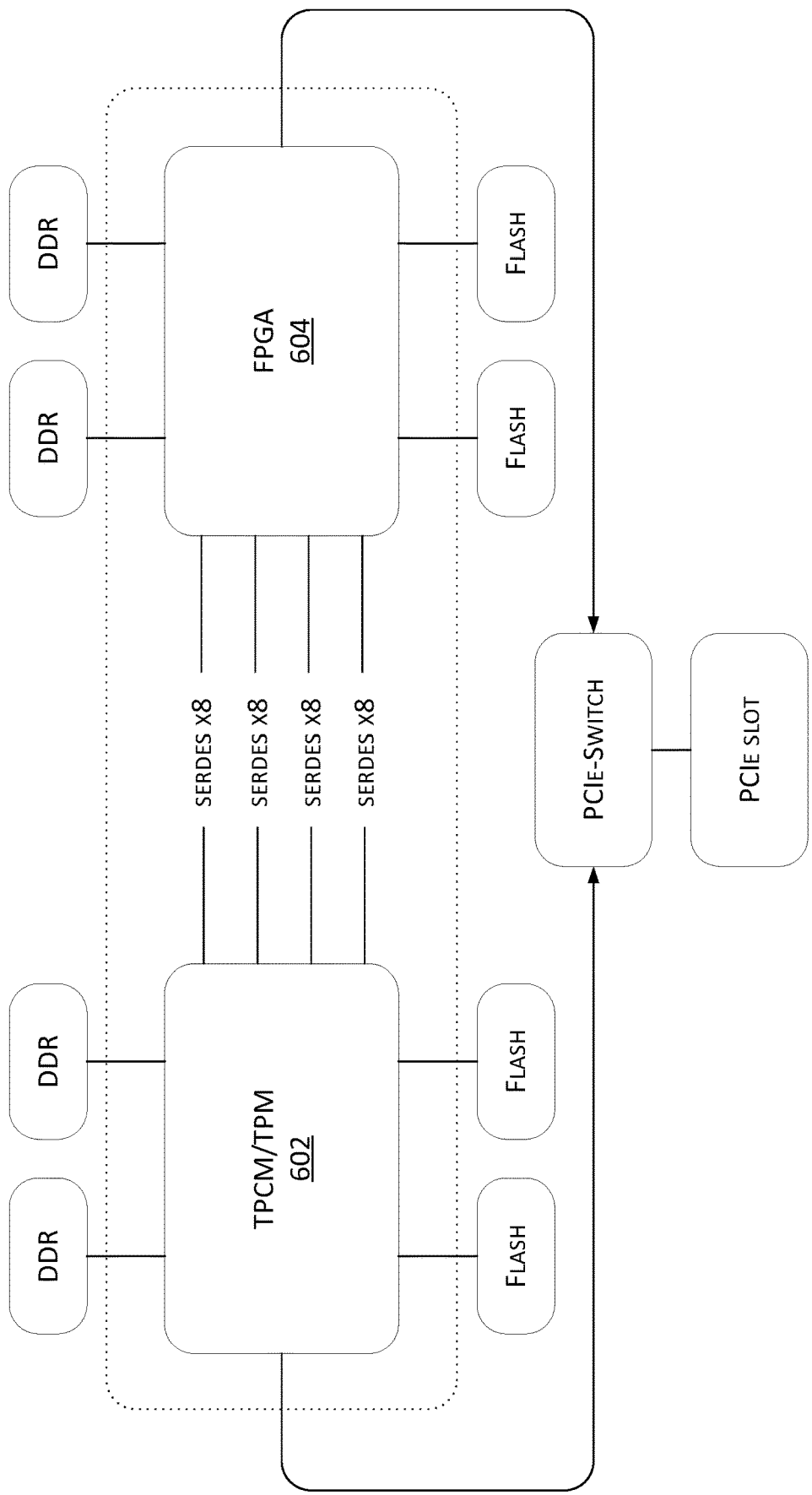
FIG. 6 is a structural block diagram of a trusted high-speed encryption card according to an example embodiment of the present disclosure.

The trusted high-speed encryption card THSDC integrates a trusted computing chip and an FPGA high-speed encryption card into one PCIE card. FIG. 6 is a structural block diagram of a trusted high-speed encryption card according to an example embodiment of the present disclosure.

As shown in FIG. 6, the data interaction between the trusted computing chip including TPCM/TPM 602 and the FPGA chip 604 is implemented directly by communication through the circuit inside the board, without the need to map the memory of a host. Each of the TPCM/TPM 602 and the FPGA 604 is associated with multiple memories including DDR and flash.

Figure 7:
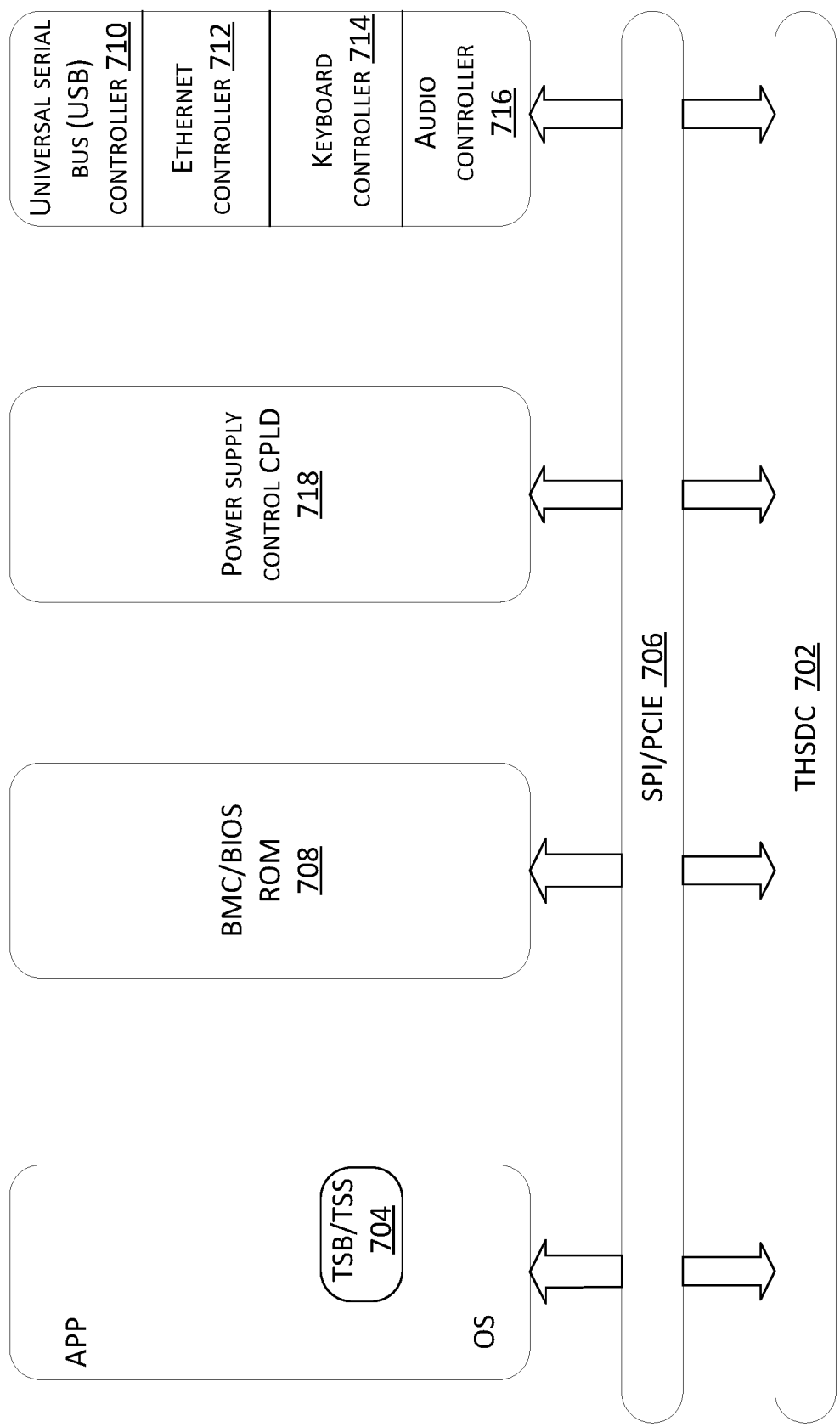
FIG. 7 is a schematic diagram of connection of a THSDC and a motherboard component according to an example embodiment of the present disclosure.

FIG. 7 is a schematic diagram of connecting a THSDC 702 and a motherboard component according to an example embodiment of the present disclosure. As shown in FIG. 7, the THSDC 702 and a trusted software base TSB 704 (or a trusted software stack TSS) perform command and data interaction through a PCIE or SPI bus 706, and realize measurement of the BMC/BIOS 708 and a connection to related controllers by multiplexing the GPIO/SPI/I2C with a multiplexer. For example, the related controllers include a universal serial bus (USB) controller 710, an ethernet controller 712, a keyboard controller 714, and an audio controller 716. A power supply control complex programmable logic device (CPLD) 718 is also connected to the PCIE or SPI bus 706.

Figure 8:
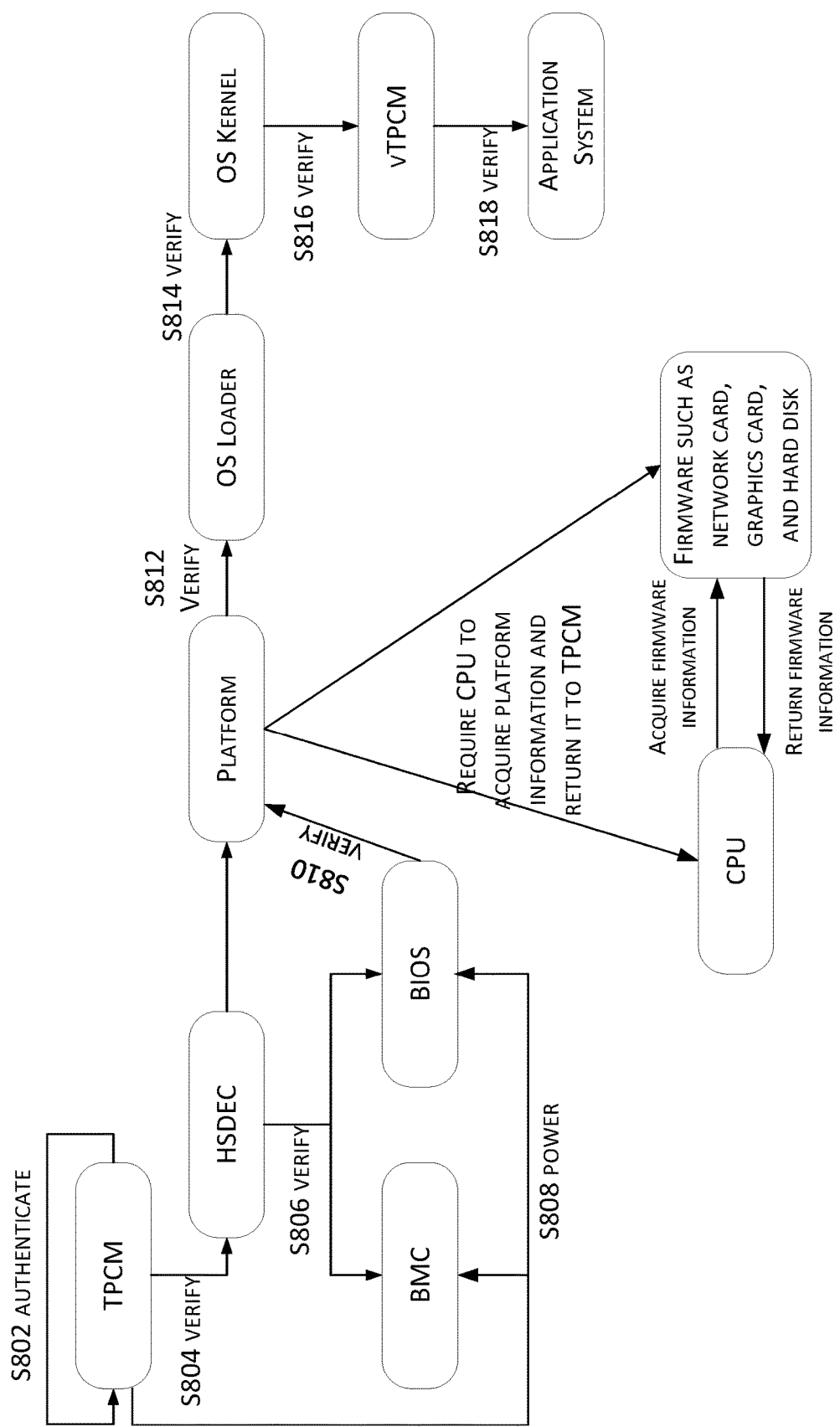
FIG. 8 is a schematic diagram of transfer of a trust chain for a trusted high-speed encryption card according to an example embodiment of the present disclosure.

A schematic construction diagram of a trusted high-speed encryption card provided in an example implementation of the present disclosure is shown below. FIG. 8 is a schematic diagram of transfer of a trust chain for a trusted high-speed encryption card according to an example embodiment of the present disclosure. As shown in FIG. 8, the following processes are included.

S802: The TPCM is powered on, a self-test is performed by the TPCM to check whether firmware is valid, wherein measurement calculation and comparison related to the self-test are performed by the TPCM, and step 2) is performed if it is valid; otherwise, an alarm is sent.

S804: A high-speed encryption card chip HSEDC (i.e., the above high-speed encryption/decryption module) is verified to check whether firmware is valid, wherein measurement calculation and comparison related to the verification are performed by the TPCM, and step S806 is performed if it is valid; otherwise, an alarm is sent.

S806: A BMC and a BIOS are verified, and the verification succeeds, wherein the verification process is implemented by the TPCM and the HSDEC jointly, data related to the BMC and the BIOS is acquired by the TPCM and sent to the HSDEC, and the acquired data is measured and calculated by the HSDEC and returned to the TPCM for comparison, and step 4) is performed if the verification succeeds; otherwise, an alarm is sent.

S808: A motherboard is powered on.

S810: The integrity of a platform is verified.

a) A CPU is required by the BIOS to obtain platform information and return it to the TPCM.

b) Firmware information of a network card, a graphics card, a hard disk, and the like is acquired by the CPU.

c) The obtained information is returned by the CPU to the TPCM.

d) The related information is transmitted by the TPCM to the HSDEC.

e) Measurement calculation is performed by the HSDEC.

f) A measurement calculation result is fed back to the TPCM by the HSDEC.

g) Verification and comparison are performed by the TPCM, and step 6) is performed if the verification succeeds; otherwise, it is shut down or an alarm is sent.

S812: An operating system (OS) loader is verified, and step S814 is performed if the verification succeeds; otherwise, it is shut down or an alarm is sent.

S814: An OS kernel is verified, and step S816 is performed if the verification succeeds; otherwise, it is shut down or an alarm is sent.

S816: A vTPCM is measured and verified dynamically, and step S818 is performed if the verification succeeds; otherwise, it is shut down or an alarm is sent.

S818: An operating system is measured and verified dynamically, and the application system is allowed to execute a request if the verification succeeds; otherwise, it is shut down or an alarm is sent.

It should be noted that in the process of transfer of the trust chain, the hash calculation and verification of all the measurement objects in steps 802 to 804 are performed in the TPCM card.

In steps after step S806, the hash calculation and verification of all the measurement objects are performed by the TPCM and the HSDEC jointly.

In step S806, firmware data of the measurement object is acquired and sent to the HSDEC by the TPCM, the measurement calculation is performed by the HSDEC, and the measurement calculation result is fed back to the TPCM for comparison by the TPCM. For the acquisition of the platform firmware information, only a method of acquiring firmware generally by a CPU commonly used in the industry is exemplified in this patent, and it is also possible that an instruction is sent by the TPCM, data of a measurement object is acquired by the HSDEC directly for calculation, and a returned result is fed back to the TPCM for comparison by the TPCM.

In step S810, an instruction is sent by the TPCM to the CPU to obtain other firmware information of the platform and return it to the TPCM. The acquired information is sent by the TPCM to the HSDEC, the measurement calculation is performed by the HSDEC, and the measurement calculation result is fed back to the TPCM for comparison by the TPCM.

In steps S812 to S818, acquisition of the data of the measurement object and the measurement calculation are performed by the HSDEC, and the measurement calculation result is fed back to the TPCM for comparison by the TPCM.

In addition, it should be pointed out that when the measurement is completed jointly by the TPCM and the HSDEC, the following three example solutions can be used: (1) The HSDEC is verified by the TPCM, data is acquired by the HSDEC subsequently for calculation, and the calculation result is fed back to the TPCM for comparison and control. In the solution, the HSDEC needs to meet certain conditions to acquire the data; and the advantage is that the high-speed performance of the HSDEC can be utilized. (2) The HSDEC is verified by the TPCM, data is acquired and sent by the TPCM to the HSDEC for calculation, and calculation is done and fed back by the HSDEC to the TPCM for comparison and control. Although the TPCM is a low-speed interface, data can be obtained by the TPCM under any existing conditions. (3) The HSDEC is verified by the TPCM, data is acquired by the HSDEC for calculation and comparison, and the comparison result is fed back to the TPCM for control. The benefit is that the service performance is improved. The HSDEC needs to meet certain conditions to acquire data, and there may be some security risks, for example, a transmission security risk when the result is transmitted by the HSDEC to the TPCM; however, the high-speed performance of the HSDEC can be utilized.

Through the example implementation, the HSDEC has higher computing power than the TPCM, thus improving the capability of sensing and preventing risks, and because it is not calculated in the CPU, this avoids leakage of sensitive information in the memory, without having to unconditionally believe that the CPU is trusted.

Example Embodiment 4

Figure 9:
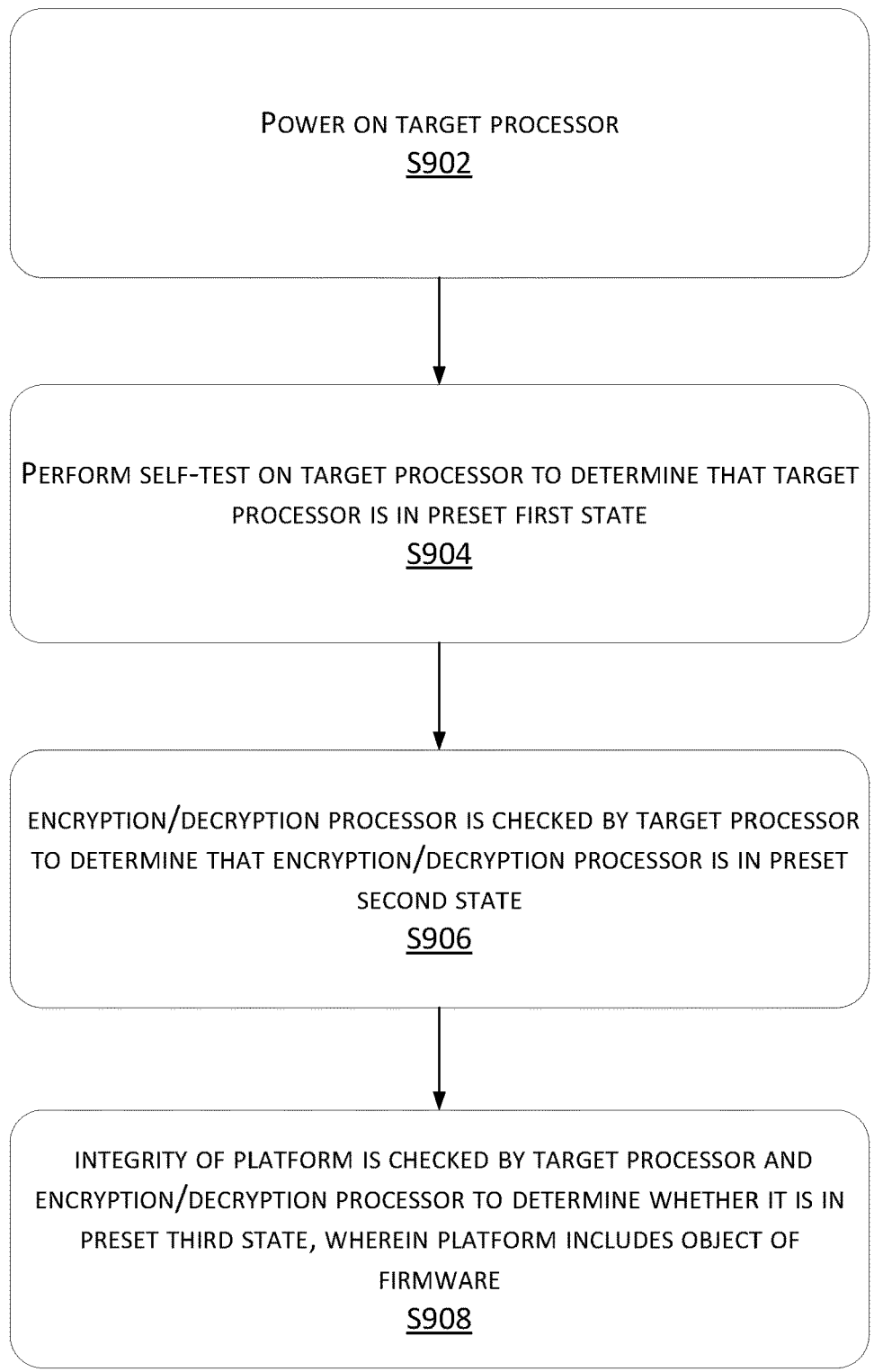
FIG. 9 is a flowchart of a data processing method according to Example embodiment 4 of the present disclosure.

A trusted measuring method as shown in FIG. 9 is provided in this application. FIG. 9 is a flowchart of a data processing method according to Example embodiment 4 of the present disclosure. As shown in FIG. 9, the process includes the following steps.

In step S902, a target processor is powered on.

In step S904, a self-test is performed on the target processor to determine that the target processor is in a preset first state.

In step S906, an encryption/decryption processor is checked by the target processor to determine that the encryption/decryption processor is in a preset second state.

In step S908, the integrity of a platform is checked by the target processor and the encryption/decryption processor to determine whether it is in a preset third state, wherein the platform includes an object of firmware.

In an example embodiment, the first state may be a measurement trusted state, the second state may be a measurement trusted state, and the third state may be a measurement trusted state.

According to the above example embodiment, when the target processor and the encryption/decryption processor are respectively checked as in a predetermined corresponding state, other objects are detected by the target processor in combination with the encryption/decryption processor. By means of the combined processing, functions that other processors are not good at can be processed according to better performance corresponding to each processor, and therefore, not only can the processing efficiency be improved, but also the risk of attacks and information leakage are avoided to some extent as the above state can be a measure trusted state.

In an example embodiment, the detection operation may be a measurement process, wherein the measurement process may include: calculating a measurement object by using a predetermined algorithm, comparing the calculation result with a pre-stored verification reference value, and determining that the integrity of the measurement object is not destroyed if the comparison result is consistent.

In an example embodiment, the platform includes an object of firmware, wherein the firmware may be simple hardware such as a network card, a graphics card, and a hard disk, or may be relatively integrated complex hardware such as an operating system loader and an operating system kernel.

In an example embodiment, the above method may further include: checking, by the target processor and the encryption/decryption processor, the integrity of a system to determine whether it is in a preset third state, wherein the system includes an object of software. That is, the integrity of the system is checked to determine whether the system is in a corresponding state, for example, to determine whether the system is in a measurement trusted state.

In an example embodiment, the system includes an object of software, wherein the software may be an inherent software program that is included in the system itself, or may be an application software program downloaded through external installation.

Example Embodiment 5

Figure 10:
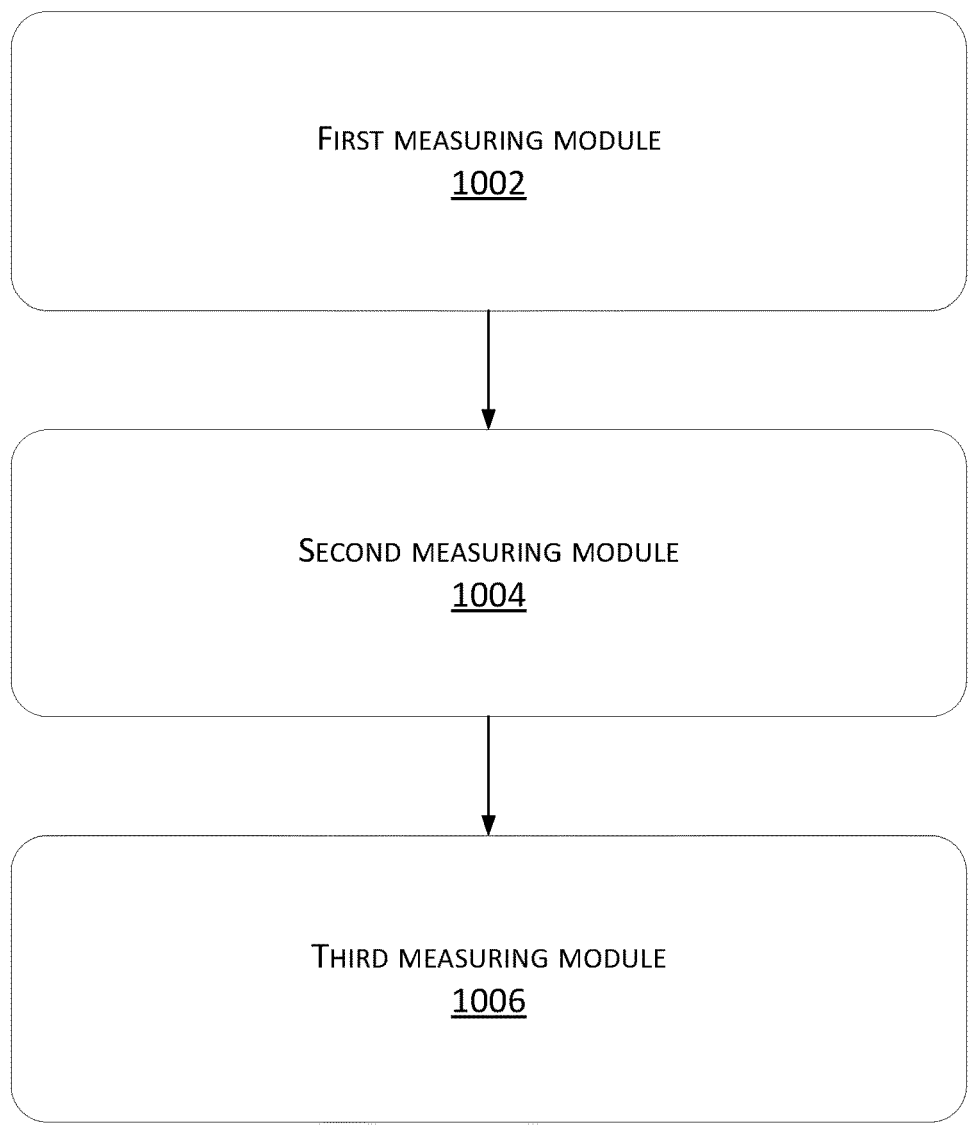
FIG. 10 is a structural block diagram of a trusted measuring apparatus according to Example embodiment 5 of the present disclosure.

According to an example embodiment of the present disclosure, a trusted measuring apparatus for implementing the above Example embodiment 1 is further provided. FIG. 10 is a structural block diagram of a trusted measuring apparatus according to Example embodiment 5 provided by the example embodiments of the present disclosure. As shown in FIG. 10, the apparatus is applied to a trusted platform control module, and includes: a first measuring module 1002, a second measuring module 1004, and a third measuring module 1006. The apparatus is described below.

The first measuring module 1002 is configured to measure, by the trusted platform control module, itself after being powered on; the second measuring module 1004 is connected to the first measuring module 1002 and configured to measure a high-speed encryption/decryption module when the measurement of the trusted platform control module by itself is valid; and the third measuring module 1006 is connected to the second measuring module 1004 and configured to measure, by the trusted platform control module in combination with the high-speed encryption/decryption module, the integrity of a platform and a system when the measurement of the high-speed encryption/decryption module by the trusted platform control module is valid.

It should be noted that the first measuring module 1002, the second measuring module 1004, and the third measuring module 106 correspond to steps S202 to S206 in Example embodiment 1, and examples and application scenarios implemented by the three modules and the corresponding steps are the same, but are not limited to the content disclosed in Example embodiment 1. It should be noted that the above modules can be stored in the memory 104 in the computer terminal 100 provided in Example embodiment 1 and operated as a part of the apparatus for trusted measuring.

Example Embodiment 6

Figure 11:
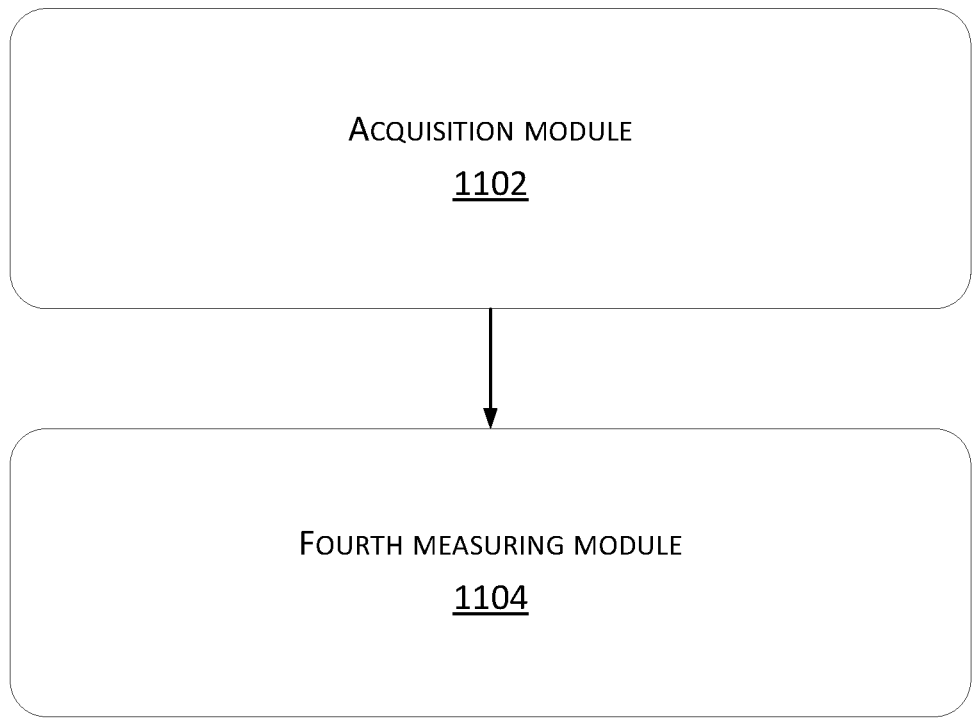
FIG. 11 is a structural block diagram of a trusted measuring apparatus according to Example embodiment 6 of the present disclosure.

According to an example embodiment of the present disclosure, a trusted measuring apparatus for implementing the above Example embodiment 2 is further provided. FIG. 11 is a structural block diagram of a trusted measuring apparatus according to Example embodiment 6 provided by the example embodiments of the present disclosure. As shown in FIG. 11, the apparatus is applied to a high-speed encryption/decryption module, and includes: an acquisition module 1102 and a fourth measuring module 1104. The apparatus is described below.

The acquisition module 1102 is configured to acquire, when the measurement of a trusted platform control module is valid, measurement data for measuring itself; and the fourth measuring module 1104 is connected to the acquisition module 1102 and configured to measure, by the high-speed encryption/decryption module in combination with the trusted platform control module, the integrity of a platform and a system when it is determined by the high-speed encryption/decryption module according to the measurement data that the measurement of itself is valid.

It should be noted that the acquisition module 1102 and the fourth measuring module 1104 correspond to steps S502 to S504 in Example embodiment 2, and examples and application scenarios implemented by the two modules and the corresponding steps are the same, but are not limited to the content disclosed in Example embodiment 2. It should be noted that the above modules can be stored in the memory 104 in the computer terminal 100 provided in Example embodiment 1 and operated as a part of the apparatus for trusted measuring.

Example Embodiment 7

Figure 12:
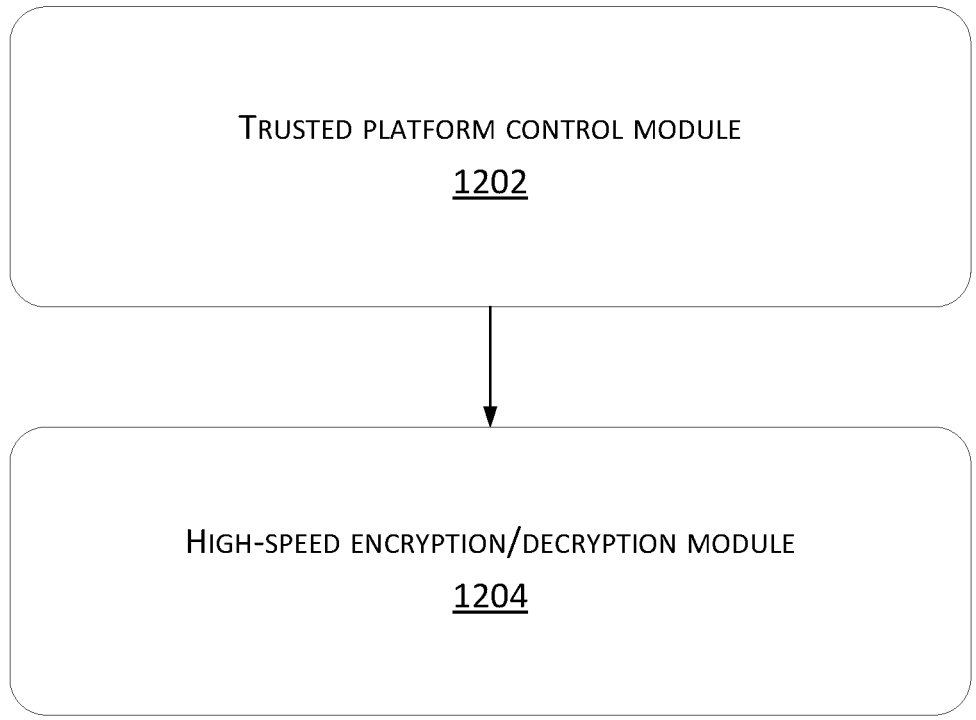
FIG. 12 is a structural block diagram of a trusted measuring system according to Example embodiment 7 of the present disclosure.

According to an example embodiment of the present disclosure, a trusted measuring system for implementing the above Example embodiment 3 is further provided. FIG. 12 is a structural block diagram of a trusted measuring system according to Example embodiment 7 provided by the example embodiments of the present disclosure. As shown in FIG. 12, the system includes: a trusted platform control module 1202 and a high-speed encryption/decryption module 1204. The system is described below.

The trusted platform control module 1202 is connected to the high-speed encryption/decryption module 1204 and configured to measure itself after the trusted platform control module is powered on, and measure the high-speed encryption/decryption module when the measurement of the trusted platform control module by itself is valid; and the trusted platform control module 1202 and the high-speed encryption/decryption module 1204 are configured to measure a baseboard management controller and a basic input/output system in combination when the measurement of the high-speed encryption/decryption module by the trusted platform control module is valid.

It should be noted that the trusted platform control module 1202 and the high-speed encryption/decryption module 1204 correspond to steps S602 to S604 in Example embodiment 3, and examples and application scenarios implemented by the two modules and the corresponding steps are the same, but are not limited to the content disclosed in Example embodiment 3. It should be noted that the above modules can be stored in the memory 104 in the computer terminal 100 provided in Example embodiment 1 and operated as a part of the apparatus for trusted measuring.

Example Embodiment 8

Figure 13:
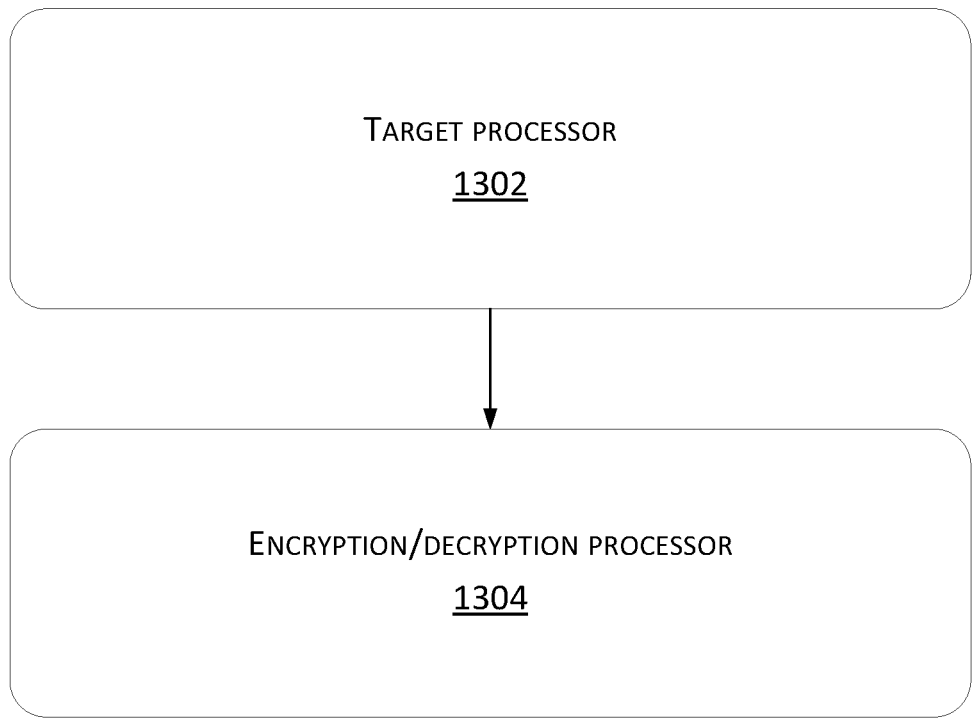
FIG. 13 is a structural block diagram of a data processing system according to Example embodiment 8 of the present disclosure.

According to an example embodiment of the present disclosure, a data processing system for implementing the above Example embodiment 4 is further provided. FIG. 13 is a structural block diagram of a data processing system according to Example embodiment 8 provided by the example embodiments of the present disclosure. As shown in FIG. 13, the system includes: a target processor 1302 and an encryption/decryption processor 1304. The system is described below.

The target processor 1302 is configured to perform a self-test after being powered on to determine that the target processor 1302 is in a preset first state; and check the encryption/decryption processor 1304 to determine that the encryption/decryption processor 1304 is in a preset second state.

The target processor 1302 and the encryption/decryption processor 1304 check the integrity of a platform to determine whether it is in a preset third state, wherein the platform includes an object of firmware.

It should be noted that the target processor 1302 and the encryption/decryption processor 1304 correspond to steps S902 to S908 in Example embodiment 4, and examples and application scenarios implemented by the two processors and the corresponding steps are the same, but are not limited to the content disclosed in Example embodiment 4. It should be noted that the above modules can be operated as a part of the apparatus embodied in the computer terminal 100 provided in Example embodiment 1.

Example Embodiment 9

A computer terminal may be provided in the example embodiments of the present disclosure. The computer terminal may be any computer terminal device in a computer terminal group. For example, in this example embodiment, the computer terminal may also be replaced with a terminal device such as a mobile terminal.

For example, in this example embodiment, the computer terminal may be located in at least one network device of a plurality of network devices of a computer network.

Figure 14:
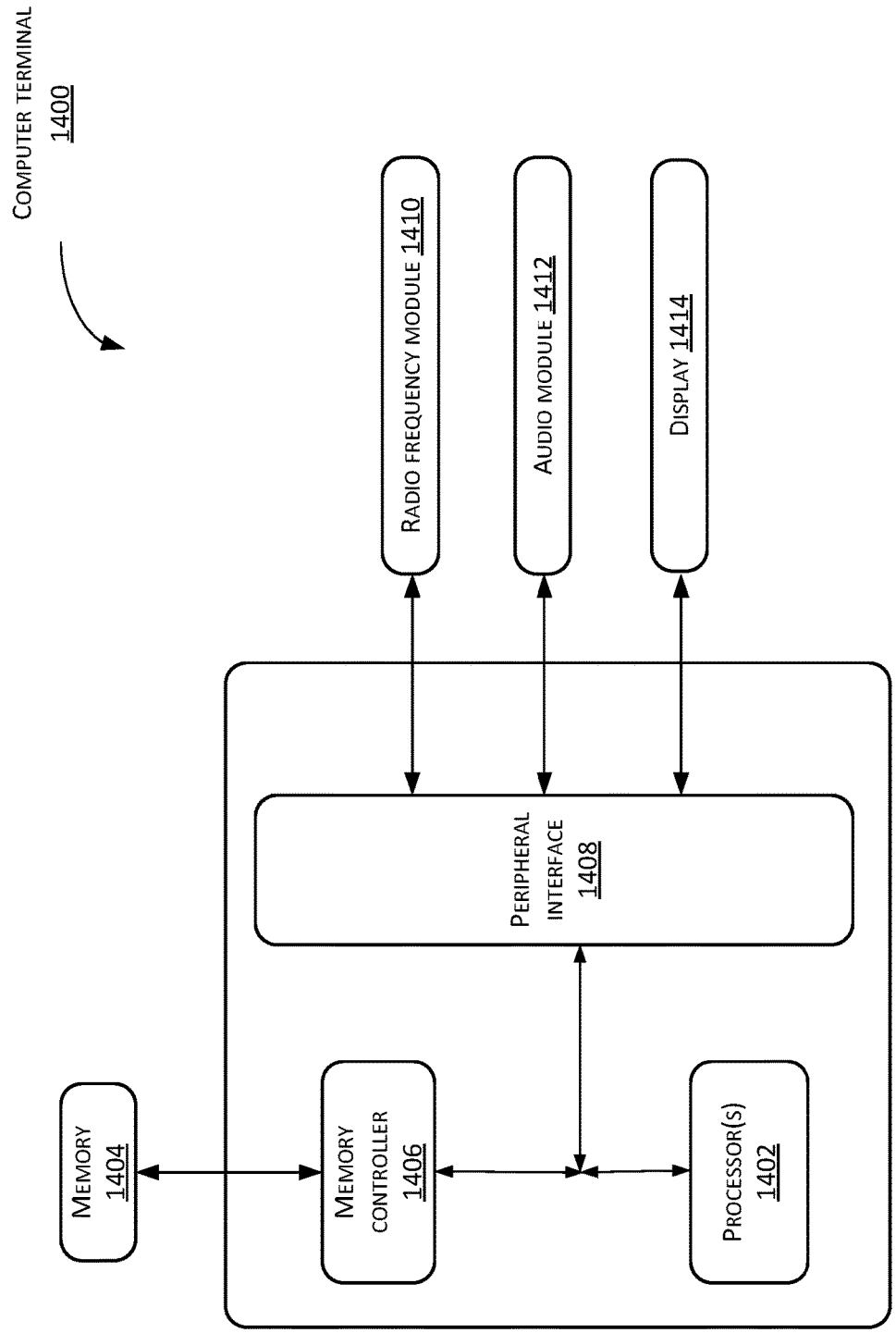
FIG. 14 is a structural block diagram of a computer terminal according to an example embodiment of the present disclosure.

For example, FIG. 14 is a structural block diagram of a computer terminal according to an example embodiment of the present disclosure.

As shown in FIG. 14, a computer terminal 1400 may include one or more (only one is shown in the figure) processors 1402 and a memory 1404. The memory 1404 communicated with a memory controller 1406 that interacts with the processors 1402 and a peripherical interface 1408. The peripheral interface 1408 interacts with a radio frequency module 1410, an audio module 1412, and a display 1414.

The memory 1404 may be configured to store software programs and modules, such as the program instructions/modules corresponding to the trusted measuring method in the example embodiment of the present disclosure. The processor 1402 executes the software programs and modules stored in the memory, thus performing various functional applications and data processing, that is, implementing the trusted measuring method. The memory 1404 can include a high-speed random-access memory and can also include a non-volatile memory, such as one or more magnetic storage apparatuses, a flash memory, or another non-volatile solid-state memory. In some examples, the memory can further include memories disposed remotely relative to the processor. These remote memories can be connected to the computer terminal over a network. An example of the network includes, but is not limited to, the Internet, an intranet, a local area network, a mobile communication network, and a combination thereof.

The processor 1402 may invoke information and application programs stored in the memory 1404 by using a transmission device, so as to perform the following steps: measuring, by a trusted platform control module, itself after being powered on; measuring, by the trusted platform control module, a high-speed encryption/decryption module when the measurement of the trusted platform control module by itself is valid; and measuring, by the trusted platform control module in combination with the high-speed encryption/decryption module, the integrity of a platform and a system when the measurement of the high-speed encryption/decryption module by the trusted platform control module is valid.

For example, the processor 1402 may further execute program codes or computer-readable instructions of the following steps: the measuring, by the trusted platform control module, the high-speed encryption/decryption module including: receiving, by the trusted platform control module, measurement data sent by the high-speed encryption/decryption module for measuring the high-speed encryption/decryption module, or acquiring, by the trusted platform control module itself, measurement data for measuring the high-speed encryption/decryption module; measuring, by the trusted platform control module, the high-speed encryption/decryption module according to the measurement data for measuring the high-speed encryption/decryption module, and obtaining a measurement result; and comparing, by the trusted platform control module, the measurement result with a verification reference value, and determining that the high-speed encryption/decryption module is valid if the comparison result is consistent.

For example, the processor 1402 may further execute program codes or computer-readable instructions of the following steps: the measuring, by the trusted platform control module in combination with the high-speed encryption/decryption module, the integrity of a platform and a system including: determining, by the trusted platform control module, a measurement object to be measured in the platform and the system; receiving, by the trusted platform control module, a measurement result sent by the high-speed encryption/decryption module, wherein the measurement result is obtained by measuring the measurement object by the high-speed encryption/decryption module according to measurement data of the measurement object after the measurement data is acquired; and comparing, by the trusted platform control module, the measurement result with a verification reference value to obtain a comparison result, and determining that the measurement object is valid if the comparison result is consistent.

For example, the processor 1402 may further execute program codes or computer-readable instructions of the following steps: the measuring, by the trusted platform control module in combination with the high-speed encryption/decryption module, the integrity of a platform and a system including: determining, by the trusted platform control module, a measurement object to be measured in the platform and the system; receiving, by the trusted platform control module, the comparison result sent by the high-speed encryption/decryption module, wherein the comparison result is obtained by measuring the measurement object by the high-speed encryption/decryption module according to measurement data of the measurement object upon acquisition of the measurement data to obtain a measurement result, and comparing the measurement result with the verification reference value; and determining, by the trusted platform control module, that the measurement object is valid if the comparison result is consistent.

For example, the processor 1402 may further execute program codes or computer-readable instructions of the following steps: the measuring, by the trusted platform control module in combination with the high-speed encryption/decryption module, the integrity of a platform and a system including: determining, by the trusted platform control module, a measurement object to be measured in the platform and the system; acquiring, by the trusted platform control module, measurement data of the measurement object, and sending the measurement data to the high-speed encryption/decryption module; receiving, by the trusted platform control module, a measurement result sent by the high-speed encryption/decryption module, wherein the measurement result is obtained by measuring the measurement object by the high-speed encryption/decryption module according to measurement data sent by the trusted platform control module; and comparing, by the trusted platform control module, the measurement result with a verification reference value to obtain a comparison result, and determining that the measurement object is valid if the comparison result is consistent.

For example, the processor 1402 may further execute program codes or computer-readable instructions of the following steps: the measurement objects included in the complete trust chain of the trusted high-speed encryption card including: a baseboard management controller, a basic input/output system, an operating system loader, an operating system kernel, a virtual trusted platform control module, and an application system.

The processor 1402 may invoke information and application programs stored in the memory 1404 by using a transmission device, so as to perform the following steps: acquiring, by a high-speed encryption/decryption module in combination with the trusted platform control module, measurement data for measuring itself when measurement of a trusted platform control module is valid; and measuring, by the high-speed encryption/decryption module, the integrity of a platform and a system when it is determined by the high-speed encryption/decryption module according to the measurement data that the measurement of itself is valid.

For example, the processor 1402 may further execute program codes or computer-readable instructions of the following steps: the determination by the high-speed encryption/decryption module according to the measurement data that its measurement thereof is valid including: feeding, by the high-speed encryption/decryption module, measurement result obtained after measuring itself according to the measurement data back to the trusted platform control module; and determining, by the high-speed encryption/decryption module, that the measurement of itself is valid if the received measurement result fed back by the trusted platform control module is consistent with the verification reference value.

For example, the processor 1402 may further execute program codes or computer-readable instructions of the following steps: the measuring, by the high-speed encryption/decryption module in combination with the trusted platform control module, the integrity of a platform and a system including: determining, by the high-speed encryption/decryption module, a measurement object to be measured in the platform and the system; acquiring, by the high-speed encryption/decryption module, measurement data of the measurement object, measuring the measurement object according to the measurement data to obtain a measurement result, and sending the measurement result to the trusted platform control module, wherein the measurement result is used by the trusted platform control module to be compared with the verification reference value to obtain a comparison result, and it is determined that the measurement object is valid if the comparison result is consistent.

For example, the processor 1402 may further execute program codes or computer-readable instructions of the following steps: the measuring, by the high-speed encryption/decryption module in combination with the trusted platform control module, the integrity of a platform and a system including: determining, by the high-speed encryption/decryption module, a measurement object to be measured in the platform and the system; acquiring, by the high-speed encryption/decryption module, measurement data of the measurement object, measuring the measurement object according to the measurement data to obtain a measurement result, comparing the measurement result with the verification reference value to obtain a comparison result, and sending the comparison result to the trusted platform control module, wherein it is determined that the measurement object is valid if the comparison result is consistent.

For example, the processor 1402 may further execute program codes or computer-readable instructions of the following steps: the measuring, by the high-speed encryption/decryption module in combination with the trusted platform control module, the integrity of a platform and a system including: determining, by the high-speed encryption/decryption module, a measurement object to be measured in the platform and the system; receiving, by the high-speed encryption/decryption module, measurement data sent by the trusted platform control module for measuring the measurement object; measuring, by the high-speed encryption/decryption module, the measurement object according to the measurement data to obtain a measurement result, and sending the measurement result to the trusted platform control module, wherein the measurement result is used by the trusted platform control module to be compared with the verification reference value to obtain a comparison result, and it is determined that the measurement object is valid if the comparison result is consistent.

For example, the processor 1402 may further execute program codes or computer-readable instructions of the following steps: the measuring the integrity of a platform and a system including measuring at least one of the following measurement objects: a baseboard management controller, a basic input/output system, an operating system loader, an operating system kernel, a virtual trusted platform control module, and an application system.

The processor 1402 may invoke information and application programs stored in the memory 1404 by using a transmission device, so as to perform the following steps: powering on a trusted platform control module, and measuring, by the trusted platform control module, itself; measuring, by the trusted platform control module, a high-speed encryption/decryption module when the measurement of the trusted platform control module by itself is valid; and measuring, by the trusted platform control module in combination with the high-speed encryption/decryption module, a baseboard management controller and a basic input/output system when the measurement of the high-speed encryption/decryption module by the trusted platform control module is valid.

For example, the processor 1402 may further execute program codes or computer-readable instructions of the following steps: the measuring, by the trusted platform control module in combination with the high-speed encryption/decryption module, a baseboard management controller and a basic input/output system including: acquiring, by the trusted platform control module, measurement data for measuring the baseboard management controller and the basic input/output system; sending the acquired measurement data to the high-speed encryption/decryption module; measuring, by the high-speed encryption/decryption module, the measurement data to obtain a measurement result, and sending the measurement result to the trusted platform control module; and comparing, by the trusted platform control module, the measurement result with the verification reference value to obtain a comparison result, and determining that the baseboard management controller and the basic input/output system are valid when the comparison result is consistent.

For example, the processor 1402 may further execute program codes or computer-readable instructions of the following steps: measuring, by the trusted platform control module in combination with the high-speed encryption/decryption module, an operating system platform, wherein the measuring, by the trusted platform control module in combination with the high-speed encryption/decryption module, an operating system platform includes: acquiring, by the trusted platform control module, measurement data of the operating system platform, and sending the measurement data of the operating system platform to the high-speed encryption/decryption module; measuring, by the high-speed encryption/decryption module, the operating system platform according to the measurement data of the operating system platform to obtain a measurement result, and sending the measurement result to the trusted platform control module; and comparing, by the trusted platform control module, the measurement result with the verification reference value to obtain a comparison result, and determining that the operating system platform is valid if the comparison result is consistent.

For example, the processor 1402 may further execute program codes or computer-readable instructions of the following steps: the following measurement objects included in the complete trust chain of the trusted high-speed encryption card being measured sequentially by the trusted platform control module in combination with the high-speed encryption/decryption module: an operating system loader, an operating system kernel, a virtual trusted platform control module, and an application system, wherein at least one of the above measurement objects included in the complete trust chain of the trusted high-speed encryption card is measured by the trusted platform control module in combination with the high-speed encryption/decryption module in the following manner: acquiring, by the trusted platform control module, measurement data of the measurement, and sending the measurement data of the measurement object to the high-speed encryption/decryption module; measuring, by the high-speed encryption/decryption module, the measurement object according to the measurement data of the measurement object to obtain a measurement result, and sending the measurement result to the trusted platform control module; and comparing, by the trusted platform control module, the measurement result with the verification reference value to obtain a comparison result, and determining that the measurement object is valid if the comparison result is consistent.

The processor 1402 may invoke information and application programs stored in the memory 1404 by using a transmission device, so as to perform the following steps: powering on a target processor; performing a self-test on the target processor to determine that the target processor is in a preset first state; checking, by the target processor, an encryption/decryption processor to determine that the encryption/decryption processor is in a preset second state; and checking, by the target processor and the encryption/decryption processor, the integrity of a platform to determine whether it is in a preset third state, wherein the platform includes an object of firmware.

For example, the first state is a measurement trusted state, and the second state is a measurement trusted state.

For example, the processor 1402 may further execute program codes or computer-readable instructions of the following steps: checking, by the target processor and the encryption/decryption processor, the integrity of a system to determine whether it is in a preset third state, wherein the system includes an object of software.

A trusted measuring solution is provided by using the example embodiments of the present disclosure. Through the combined measurement of the trusted platform control module and the high-speed encryption/decryption module, not only is high performance can be achieved due to the high-performance encryption/decryption module, but also the objective of completely trusted risk avoidance can be achieved due to the trusted platform control module, thus solving the technical problems of low performance of trusted measurement, insensitiveness to attack risks, and information leakage risks in conventional techniques.

Those of ordinary skill in the art can understand that the structure shown in FIG. 14 is only an illustration, and the computer terminal can also be smart phones (such as Android phones and iOS phones), tablet computers, palmtop computers, Mobile Internet Devices (MIDs), PADs, and other terminal devices. FIG. 14 does not limit the structure of the above electronic device. For example, the computer terminal 1400 may also include more or fewer components (such as a network interface and a display apparatus) than those shown in FIG. 14, or have a configuration different from that shown in FIG. 14.

Those of ordinary skill in the art may understand that all or part of the steps of the above example embodiments may be implemented by a program instructing hardware related to the terminal device, and the program may be stored in a computer readable storage medium. The storage medium may include: a flash memory, a Read-Only Memory (ROM), a Random-Access Memory (RAM), a magnetic disk, or an optical disc.

Example Embodiment 10

A memory or storage medium is further provided in the example embodiments of the present disclosure. For example, in this example embodiment, the storage medium may be configured to store program code executed by any of the trusted measuring methods provided in Example embodiment 1 to Example embodiment 4.

For example, in this example embodiment, the storage medium may be located in any computer terminal in a computer terminal group in a computer network, or in any mobile terminal in a mobile terminal group.

In this example embodiment, the storage medium is configured to store program code for performing the following steps: measuring, by a trusted platform control module, itself after being powered on; measuring, by the trusted platform control module, a high-speed encryption/decryption module when the measurement of the trusted platform control module by itself is valid; and measuring, by the trusted platform control module in combination with the high-speed encryption/decryption module, the integrity of a platform and a system when the measurement of the high-speed encryption/decryption module by the trusted platform control module is valid.

In an example embodiment, the storage medium is further configured to store program code for performing the following step: the measuring, by the trusted platform control module, the high-speed encryption/decryption module including: receiving, by the trusted platform control module, measurement data sent by the high-speed encryption/decryption module for measuring the high-speed encryption/decryption module, or acquiring, by the trusted platform control module itself, measurement data for measuring the high-speed encryption/decryption module; measuring, by the trusted platform control module, the high-speed encryption/decryption module according to the measurement data for measuring the high-speed encryption/decryption module, and obtaining a measurement result; and comparing, by the trusted platform control module, the measurement result with a verification reference value, and determining that the high-speed encryption/decryption module is valid if the comparison result is consistent.

In an example embodiment, the storage medium is further configured to store program code for performing the following step: the measuring, by the trusted platform control module in combination with the high-speed encryption/decryption module, the integrity of a platform and a system including: determining, by the trusted platform control module, a measurement object to be measured in the platform and the system; receiving, by the trusted platform control module, a measurement result sent by the high-speed encryption/decryption module, wherein the measurement result is obtained by measuring the measurement object by the high-speed encryption/decryption module according to measurement data of the measurement object after the measurement data is acquired; and comparing, by the trusted platform control module, the measurement result with a verification reference value to obtain a comparison result, and determining that the measurement object is valid if the comparison result is consistent.

In an example embodiment, the storage medium is further configured to store program code for performing the following step: the measuring, by the trusted platform control module in combination with the high-speed encryption/decryption module, the integrity of a platform and a system including: determining, by the trusted platform control module, a measurement object to be measured in the platform and the system; receiving, by the trusted platform control module, the comparison result sent by the high-speed encryption/decryption module, wherein the comparison result is obtained by measuring the measurement object by the high-speed encryption/decryption module according to measurement data of the measurement object upon acquisition of the measurement data to obtain a measurement result, and comparing the measurement result with the verification reference value; and determining, by the trusted platform control module, that the measurement object is valid if the comparison result is consistent.

In an example embodiment, the storage medium is further configured to store program code for performing the following step: the measuring, by the trusted platform control module in combination with the high-speed encryption/decryption module, the integrity of a platform and a system including: determining, by the trusted platform control module, a measurement object to be measured in the platform and the system; acquiring, by the trusted platform control module, measurement data of the measurement object, and sending the measurement data to the high-speed encryption/decryption module; receiving, by the trusted platform control module, a measurement result sent by the high-speed encryption/decryption module, wherein the measurement result is obtained by measuring the measurement object by the high-speed encryption/decryption module according to measurement data sent by the trusted platform control module; and comparing, by the trusted platform control module, the measurement result with a verification reference value to obtain a comparison result, and determining that the measurement object is valid if the comparison result is consistent.

In an example embodiment, the storage medium is further configured to store program code for performing the following step: the measuring the integrity of a platform and a system including measuring at least one of the following measurement objects: a baseboard management controller, a basic input/output system, an operating system loader, an operating system kernel, a virtual trusted platform control module, and an application system.

In this example embodiment, the storage medium is configured to store program code for performing the following steps: acquiring, by a high-speed encryption/decryption module, measurement data for measuring itself when measurement of a trusted platform control module is valid; and measuring, by the high-speed encryption/decryption module in combination with the trusted platform control module, the integrity of a platform and a system when it is determined by the high-speed encryption/decryption module according to the measurement data that the measurement of itself is valid.

In an example embodiment, the storage medium is further configured to store program code for performing the following step: the determination by the high-speed encryption/decryption module according to the measurement data that its measurement thereof is valid including: feeding, by the high-speed encryption/decryption module, measurement result obtained after measuring itself according to the measurement data back to the trusted platform control module; and determining, by the high-speed encryption/decryption module, that the measurement of itself is valid if the received measurement result fed back by the trusted platform control module is consistent with the verification reference value.

In an example embodiment, the storage medium is further configured to store program code for performing the following step: the measuring, by the high-speed encryption/decryption module in combination with the trusted platform control module, the integrity of a platform and a system including: determining, by the high-speed encryption/decryption module, a measurement object to be measured in the platform and the system; acquiring, by the high-speed encryption/decryption module, measurement data of the measurement object, measuring the measurement object according to the measurement data to obtain a measurement result, and sending the measurement result to the trusted platform control module, wherein the measurement result is used by the trusted platform control module to be compared with the verification reference value to obtain a comparison result, and it is determined that the measurement object is valid if the comparison result is consistent.

In an example embodiment, the storage medium is further configured to store program code for performing the following step: the measuring, by the high-speed encryption/decryption module in combination with the trusted platform control module, the integrity of a platform and a system including: determining, by the high-speed encryption/decryption module, a measurement object to be measured in the platform and the system; acquiring, by the high-speed encryption/decryption module, measurement data of the measurement object, measuring the measurement object according to the measurement data to obtain a measurement result, comparing the measurement result with the verification reference value to obtain a comparison result, and sending the comparison result to the trusted platform control module, wherein it is determined that the measurement object is valid if the comparison result is consistent.

In an example embodiment, the storage medium is further configured to store program code for performing the following step: the measuring, by the high-speed encryption/decryption module in combination with the trusted platform control module, the integrity of a platform and a system including: determining, by the high-speed encryption/decryption module, a measurement object to be measured in the platform and the system; receiving, by the high-speed encryption/decryption module, measurement data sent by the trusted platform control module for measuring the measurement object; measuring, by the high-speed encryption/decryption module, the measurement object according to the measurement data to obtain a measurement result, and sending the measurement result to the trusted platform control module, wherein the measurement result is used by the trusted platform control module to be compared with the verification reference value to obtain a comparison result, and it is determined that the measurement object is valid if the comparison result is consistent.

In an example embodiment, the storage medium is further configured to store program code for performing the following step: the measuring the integrity of a platform and a system including measuring at least one of the following measurement objects: a baseboard management controller, a basic input/output system, an operating system loader, an operating system kernel, a virtual trusted platform control module, and an application system.

In this example embodiment, the storage medium is configured to store program code for performing the following step: powering on a trusted platform control module, and measuring, by the trusted platform control module, itself; measuring, by the trusted platform control module, a high-speed encryption/decryption module when the measurement of the trusted platform control module by itself is valid; and measuring, by the trusted platform control module in combination with the high-speed encryption/decryption module, a baseboard management controller and a basic input/output system when the measurement of the high-speed encryption/decryption module by the trusted platform control module is valid.

In an example embodiment, the storage medium is further configured to store program code for performing the following step: the measuring, by the trusted platform control module in combination with the high-speed encryption/decryption module, a baseboard management controller and a basic input/output system including: acquiring, by the trusted platform control module, measurement data for measuring the baseboard management controller and the basic input/output system; sending the acquired measurement data to the high-speed encryption/decryption module; measuring, by the high-speed encryption/decryption module, the measurement data to obtain a measurement result, and sending the measurement result to the trusted platform control module; and comparing, by the trusted platform control module, the measurement result with the verification reference value to obtain a comparison result, and determining that the baseboard management controller and the basic input/output system are valid when the comparison result is consistent.

In an example embodiment, the storage medium is further configured to store program code for performing the following step: measuring, by the trusted platform control module in combination with the high-speed encryption/decryption module, an operating system platform, wherein the measuring, by the trusted platform control module in combination with the high-speed encryption/decryption module, an operating system platform includes: acquiring, by the trusted platform control module, measurement data of the operating system platform, and sending the measurement data of the operating system platform to the high-speed encryption/decryption module; measuring, by the high-speed encryption/decryption module, the operating system platform according to the measurement data of the operating system platform to obtain a measurement result, and sending the measurement result to the trusted platform control module; and comparing, by the trusted platform control module, the measurement result with the verification reference value to obtain a comparison result, and determining that the operating system platform is valid if the comparison result is consistent.

In an example embodiment, the storage medium is further configured to store program code for performing the following step: measuring, by the trusted platform control module in combination with the high-speed encryption/decryption module, the following measurement objects included in the complete trust chain of the trusted high-speed encryption card sequentially: an operating system loader, an operating system kernel, a virtual trusted platform control module, and an application system, wherein at least one of the above measurement objects included in the complete trust chain of the trusted high-speed encryption card is measured by the trusted platform control module in combination with the high-speed encryption/decryption module in the following manner: acquiring, by the trusted platform control module, measurement data of the measurement, and sending the measurement data of the measurement object to the high-speed encryption/decryption module; measuring, by the high-speed encryption/decryption module, the measurement object according to the measurement data of the measurement object to obtain a measurement result, and sending the measurement result to the trusted platform control module; and comparing, by the trusted platform control module, the measurement result with the verification reference value to obtain a comparison result, and determining that the measurement object is valid if the comparison result is consistent.

In this example embodiment, the storage medium is configured to store program code for performing the following step: powering on a target processor; performing a self-test on the target processor to determine that the target processor is in a preset first state; checking, by the target processor, an encryption/decryption processor to determine that the encryption/decryption processor is in a preset second state; and checking, by the target processor and the encryption/decryption processor, the integrity of a platform to determine whether it is in a preset third state, wherein the platform includes an object of firmware.

In an example embodiment, the storage medium is further configured to store program code for performing the following step: the first state being a measurement trusted state, and the second state being a measurement trusted state.

In an example embodiment, the storage medium is further configured to store program code for performing the following step: checking, by the target processor and the encryption/decryption processor, the integrity of a system to determine whether it is in a preset third state, wherein the system includes an object of software.

The serial numbers of the example embodiments of the present disclosure are merely for description, and do not represent the precedence of the example embodiments.

In the above example embodiments of the present disclosure, the descriptions of the example embodiments have different focuses, and the parts not detailed in a certain example embodiment can be obtained with reference to the related descriptions of other example embodiments.

In the several example embodiments provided by the present disclosure, it should be understood that the disclosed technical content may be implemented in other manners. The apparatus example embodiments described above are merely illustrative. For example, the division of units is only a logical functional division. In actual implementation, there may be other division manners. For example, multiple units or components may be combined or may be integrate into another system, or some features may be ignored or not executed. In addition, the mutual coupling or direct coupling or communication connection shown or discussed may be an indirect coupling or communication connection through some interfaces, units or modules, and may be in an electrical form or other forms.

The units described as separate components may or may not be physically separated, and the components displayed as units may or may not be physical units, that is, they may be located in one place, or may be distributed to multiple network units. Some or all of the units may be selected according to actual needs to achieve the objective of the solution of the example embodiment.

In addition, various functional units in the example embodiments of the present disclosure may be integrated into one processing unit, or each unit may exist physically separately, or two or more units may be integrated into one unit. The integrated unit can be implemented in the form of hardware or in the form of a software functional unit.

The integrated unit, if implemented in the form of a software functional unit and sold or used as an independent product, may be stored in a computer readable storage medium. Based on such understanding, the technical solution of the present disclosure essentially or the parts contributing to the prior art, or all or part of the technical solution may be embodied in the form of a software product. The computer software product is stored in a storage medium including several instructions for enabling a computing device (which may be a personal computer, a server, a network device, or the like) to perform all or part of the methods described in various example embodiments of the present disclosure. The storage medium includes: a USB flash disk, an ROM, an RAM, a removable hard disk, a magnetic disk, an optical disk, or other media capable of storing program code.

The above descriptions are only example embodiments of the present disclosure, and it should be noted that those of ordinary skill in the art can also make several improvements and modifications without departing from the principles of the present disclosure, and these improvements and embellishments should also be considered as falling within the protection scope of the present disclosure.

The present disclosure may further be understood with clauses as follows.

Clause 1. A trusted measuring method, comprising:
measuring, by a trusted platform control module, itself after being powered on;
measuring, by the trusted platform control module, a high-speed encryption/decryption module when the measurement of the trusted platform control module by itself is valid; and
measuring, by the trusted platform control module in combination with the high-speed encryption/decryption module, the integrity of a platform and a system when the measurement of the high-speed encryption/decryption module by the trusted platform control module is valid, wherein the measuring process comprises: calculating a measurement object by using a predetermined algorithm, comparing the calculation result with a pre-stored verification reference value, and determining that the integrity of the measurement object is not destroyed if the comparison result is consistent.

Clause 2. The method of clause 1, wherein the measuring, by the trusted platform control module, a high-speed encryption/decryption module comprises:
receiving, by the trusted platform control module, measurement data sent by the high-speed encryption/decryption module for measuring the high-speed encryption/decryption module, or acquiring, by the trusted platform control module by itself, measurement data for measuring the high-speed encryption/decryption module;
measuring, by the trusted platform control module, the high-speed encryption/decryption module according to the measurement data for measuring the high-speed encryption/decryption module to obtain a measurement result; and
comparing, by the trusted platform control module, the measurement result with the verification reference value, and determining that the high-speed encryption/decryption module is valid if the comparison result is consistent.

Clause 3. The method of clause 1, wherein the measuring, by the trusted platform control module in combination with the high-speed encryption/decryption module, the integrity of a platform and a system comprises:

determining, by the trusted platform control module, a measurement object to be measured in the platform and the system;
receiving, by the trusted platform control module, the measurement result sent by the high-speed encryption/decryption module, wherein the measurement result is obtained by measuring the measurement object by the high-speed encryption/decryption module according to measurement data of the measurement object after the measurement data is acquired; and
comparing, by the trusted platform control module, the measurement result with the verification reference value to obtain a comparison result, and determining that the measurement object is valid if the comparison result is consistent.

Clause 4. The method of clause 1, wherein the measuring, by the trusted platform control module in combination with the high-speed encryption/decryption module, the integrity of a platform and a system comprises:
determining, by the trusted platform control module, a measurement object to be measured in the platform and the system;
receiving, by the trusted platform control module, the comparison result sent by the high-speed encryption/decryption module, wherein the comparison result is obtained by measuring the measurement object by the high-speed encryption/decryption module according to measurement data of the measurement object upon acquisition of the measurement data to obtain a measurement result, and comparing the measurement result with the verification reference value; and
determining, by the trusted platform control module, that the measurement object is valid if the comparison result is consistent.

Clause 5. The method of clause 1, wherein the measuring, by the trusted platform control module in combination with the high-speed encryption/decryption module, the integrity of a platform and a system comprises:
determining, by the trusted platform control module, a measurement object to be measured in the platform and the system;
acquiring, by the trusted platform control module, measurement data of the measurement object, and sending the measurement data to the high-speed encryption/decryption module;
receiving, by the trusted platform control module, the measurement result sent by the high-speed encryption/decryption module, wherein the measurement result is obtained by measuring the measurement object by the high-speed encryption/decryption module according to the measurement data sent by the trusted platform control module; and
comparing, by the trusted platform control module, the measurement result with the verification reference value to obtain a comparison result, and determining that the measurement object is valid if the comparison result is consistent.

Clause 6. The method of any of clauses 1 to 5, wherein the measuring the integrity of a platform and a system comprises measuring at least one of the following measurement objects:
a baseboard management controller, a basic input/output system, an operating system loader, an operating system kernel, a virtual trusted platform control module, and an application system.

Clause 7. A trusted measuring method, comprising:

acquiring, by a high-speed encryption/decryption module, measurement data for measuring itself when measurement of a trusted platform control module is valid;

measuring, by the high-speed encryption/decryption module in combination with the trusted platform control module, the integrity of a platform and a system when it is determined by the high-speed encryption/decryption module according to the measurement data that the measurement of itself is valid, wherein the measuring process comprises: calculating a measurement object by using a predetermined algorithm, comparing the calculation result with a pre-stored verification reference value, and determining that the integrity of the measurement object is not destroyed if the comparison result is consistent.

Clause 8. The method of clause 7, wherein the determination by the high-speed encryption/decryption module according to the measurement data that its measurement thereof is valid comprises:

feeding, by the high-speed encryption/decryption module, measurement result obtained after measuring itself according to the measurement data back to the trusted platform control module; and determining, by the high-speed encryption/decryption module, that its measurement is valid if the received measurement result fed back by the trusted platform control module is consistent with the verification reference value.

Clause 9. The method of clause 7, wherein the measuring, by the high-speed encryption/decryption module in combination with the trusted platform control module, the integrity of a platform and a system comprises:

determining, by the high-speed encryption/decryption module, a measurement object to be measured in the platform and the system; and acquiring, by the high-speed encryption/decryption module, measurement data of the measurement object, measuring the measurement object according to the measurement data to obtain a measurement result, and sending the measurement result to the trusted platform control module, wherein the measurement result is compared with the verification reference value by the trusted platform control module to obtain a comparison result, and it is determined that the measurement object is valid if the comparison result is consistent.

Clause 10. The method of clause 7, wherein the measuring, by the high-speed encryption/decryption module in combination with the trusted platform control module, the integrity of a platform and a system comprises:

determining, by the high-speed encryption/decryption module, a measurement object to be measured in the platform and the system; and acquiring, by the high-speed encryption/decryption module, measurement data of the measurement object, measuring the measurement object according to the measurement data to obtain a measurement result, comparing the measurement result with the verification reference value to obtain a comparison result, and sending the comparison result to the trusted platform control module, wherein it is determined that the measurement object is valid if the comparison result is consistent.

Clause 11. The method of clause 7, wherein the measuring, by the high-speed encryption/decryption module in combination with the trusted platform control module, the integrity of a platform and a system comprises:

determining, by the high-speed encryption/decryption module, a measurement object to be measured in the platform and the system;

receiving, by the high-speed encryption/decryption module, measurement data sent by the trusted platform control module for measuring the measurement object; and measuring, by the high-speed encryption/decryption module, the measurement object according to the measurement data to obtain a measurement result, and sending the measurement result to the trusted platform control module, wherein the measurement result is compared with the verification reference value by the trusted platform control module to obtain a comparison result, and it is determined that the measurement object is valid if the comparison result is consistent.

Clause 12. The method of any of clauses 7 to 11, wherein the measuring the integrity of a platform and a system comprises measuring at least one of the following measurement objects:

a baseboard management controller, a basic input/output system, an operating system loader, an operating system kernel, a virtual trusted platform control module, and an application system.

Clause 13. A trusted measuring method, comprising:

powering on a trusted platform control module, and measuring, by the trusted platform control module, itself;

measuring, by the trusted platform control module, a high-speed encryption/decryption module when the measurement of the trusted platform control module by itself is valid; and measuring, by the trusted platform control module in combination with the high-speed encryption/decryption module, a baseboard management controller and a basic input/output system when the measurement of the high-speed encryption/decryption module by the trusted platform control module is valid, wherein the measuring process comprises: calculating a measurement object by using a predetermined algorithm, comparing the calculation result with a pre-stored verification reference value, and determining that the integrity of the measurement object is not destroyed if the comparison result is consistent.

Clause 14. The method of clause 13, wherein the measuring, by the trusted platform control module in combination with the high-speed encryption/decryption module, the baseboard management controller and the basic input/output system comprises:

acquiring, by the trusted platform control module, measurement data for measuring the baseboard management controller and the basic input/output system, and sending the acquired measurement data to the high-speed encryption/decryption module;

measuring, by the high-speed encryption/decryption module, the measurement data to obtain a measurement result, and sending the measurement result to the trusted platform control module; and comparing, by the trusted platform control module, the measurement result with the verification reference value to obtain a comparison result, and determining that the baseboard management controller and the basic input/output system are valid if the comparison result is consistent.

Clause 15. The method of clause 14, further comprising: measuring, by the trusted platform control module in combination with the high-speed encryption/decryption module, an operating system platform, wherein the measuring, by the trusted platform control module in combination with the high-speed encryption/decryption module, an operating system platform comprises:

acquiring, by the trusted platform control module, measurement data of the operating system platform, and sending the measurement data of the operating system platform to the high-speed encryption/decryption module;

measuring, by the high-speed encryption/decryption module, the operating system platform according to the measurement data of the operating system platform to obtain a measurement result, and sending the measurement result to the trusted platform control module; and comparing, by the trusted platform control module, the measurement result with the verification reference value to obtain a comparison result, and determining that the operating system platform is valid if the comparison result is consistent.

Clause 16. The method of clause 15, wherein the method further comprises: measuring, by the trusted platform control module in combination with the high-speed encryption/decryption module, the following measurement objects comprised in a complete trust chain of a trusted high-speed encryption card sequentially: an operating system loader, an operating system kernel, a virtual trusted platform control module, and an application system, wherein at least one of the above measurement objects comprised in the complete trust chain of the trusted high-speed encryption card is measured by the trusted platform control module in combination with the high-speed encryption/decryption module in the following manner:

acquiring, by the trusted platform control module, measurement data of the measurement, and sending the measurement data of the measurement object to the high-speed encryption/decryption module;

measuring, by the high-speed encryption/decryption module, the measurement object according to the measurement data of the measurement object to obtain a measurement result, and sending the measurement result to the trusted platform control module; and comparing, by the trusted platform control module, the measurement result with the verification reference value to obtain a comparison result, and determining that the measurement object is valid if the comparison result is consistent.

Clause 17. A trusted measuring apparatus, applied to a trusted platform control module, comprising:

a first measuring module configured to measure, by the trusted platform control module, itself after being powered on;

a second measuring module configured to measure a high-speed encryption/decryption module when the measurement of the trusted platform control module by itself is valid; and a third measuring module configured to measure, by the trusted platform control module in combination with the high-speed encryption/decryption module, the integrity of a platform and a system when the measurement of the high-speed encryption/decryption module by the trusted platform control module is valid, wherein the measuring process comprises: calculating a measurement object by using a predetermined algorithm, comparing the calculation result with a pre-stored verification reference value, and determining that the integrity of the measurement object is not destroyed if the comparison result is consistent.

Clause 18. A trusted measuring apparatus, applied to a high-speed encryption/decryption module, comprising:

an acquisition module configured to acquire, when the measurement of a trusted platform control module is valid, measurement data for measuring itself;

a fourth measuring module configured to measure, by the high-speed encryption/decryption module in combination with the trusted platform control module, the integrity of a platform and a system when it is determined by the high-speed encryption/decryption module according to the measurement data that the measurement of itself is valid, wherein the measuring process comprises: calculating a measurement object by using a predetermined algorithm, comparing the calculation result with a pre-stored verification reference value, and determining that the integrity of the measurement object is not destroyed if the comparison result is consistent.

Clause 19. A trusted measuring system, comprising a trusted platform control module and a high-speed encryption/decryption module, wherein, the trusted platform control module is configured to measure itself after the trusted platform control module is powered on, and measure the high-speed encryption/decryption module when the measurement of the trusted platform control module by itself is valid; and the trusted platform control module and the high-speed encryption/decryption module are configured to jointly measure a baseboard management controller and a basic input/output system when the measurement of the high-speed encryption/decryption module by the trusted platform control module is valid, wherein the measuring process comprises: calculating a measurement object by using a predetermined algorithm, comparing the calculation result with a pre-stored verification reference value, and determining that the integrity of the measurement object is not destroyed if the comparison result is consistent.

Clause 20. A storage medium, comprising a stored program, wherein a device in which the storage medium is located is controlled during running of the program to perform the trusted measuring method of any one of clauses 1 to 16.

Clause 21. A computing device, comprising a memory and a processor, wherein a computer program is stored in the memory; and the processor is configured to execute the computer program stored in the memory, and to perform the trusted measuring method of any one of clauses 1 to 16 during running of the computer program.

Clause 22. A data processing method, comprising:

powering on a target processor;

performing a self-test on the target processor to determine that the target processor is in a preset first state;

checking, by the target processor, an encryption/decryption processor to determine that the encryption/decryption processor is in a preset second state; and checking, by the target processor and the encryption/decryption processor, the integrity of a platform to determine whether it is in a preset third state, wherein the platform comprises an object of firmware.

Clause 23. The method of clause 22, wherein the first state is a measurement trusted state, and the second state is a measurement trusted state.

Clause 24. The method of clause 22, further comprising:

checking, by the target processor and the encryption/decryption processor, the integrity of a system to determine whether it is in a preset third state, wherein the system comprises an object of software.

What is claimed is:

1. A method comprising:

measuring, by a trusted platform control module after being powered on, the trusted platform control module;

measuring, by the trusted platform control module, an encryption/decryption module, in response to determining that a measurement of the trusted platform control module is valid, the measuring, by the trusted platform control module, the encryption/decryption module including:
  receiving, by the trusted platform control module, measurement data sent by the encryption/decryption module for measuring the encryption/decryption module;
  measuring, by the trusted platform control module, the encryption/decryption module according to the measurement data to obtain a measurement result of the encryption/decryption module;
  comparing, by the trusted platform control module, the measurement result of the encryption/decryption module with a verification reference value of the encryption/decryption module; and
  determining that the encryption/decryption module is valid, in response to determining that a comparison result between the measurement result of the encryption/decryption module and the verification reference value of the encryption/decryption module is consistent; and
measuring, by the trusted platform control module in combination with the encryption/decryption module, an integrity of a platform or a system, in response to determining that a measurement of the encryption/decryption module is valid.

2. The method of claim 1, wherein the receiving, by the trusted platform control module, the measurement data sent by the encryption/decryption module for measuring the encryption/decryption module comprises:
  acquiring, by the trusted platform control module, the measurement data for measuring the encryption/decryption module.

3. The method of claim 1, wherein the measuring, by the trusted platform control module in combination with the encryption/decryption module, the integrity of the platform or the system comprises:
  determining, by the trusted platform control module, a measurement object to be measured in the platform or the system;
  receiving, by the trusted platform control module, a measurement result of the measurement object sent by the encryption/decryption module;
  comparing, by the trusted platform control module, the measurement result of the measurement object with a verification reference value of the measurement object to obtain a comparison result between the measurement result of the measurement object with a verification reference value of the measurement object; and
  determining that the measurement object is valid, in response to determining that the comparison result between the measurement result of the measurement object with the verification reference value of the measurement object is consistent.

4. The method of claim 3, wherein the measurement result of the measurement object is obtained by measuring, by the encryption/decryption module, the measurement object according to measurement data of the measurement object after the measurement data of the measurement object is acquired.

5. The method of claim 1, wherein the measuring, by the trusted platform control module in combination with the encryption/decryption module, the integrity of the platform or the system comprises:
  determining, by the trusted platform control module, a measurement object of the measurement object to be measured in the platform or the system;
  receiving, by the trusted platform control module, a comparison result of the measurement object sent by the encryption/decryption module; and
  determining, by the trusted platform control module, that the measurement object is valid in response to determining that the comparison result of the measurement object is consistent.

6. The method of claim 5, wherein the comparison result of the measurement object is obtained by:
  measuring the measurement object, by the encryption/decryption module, according to measurement data of the measurement object upon acquisition of the measurement and comparing a measurement result of the measurement object with a verification reference value of the measurement object.

7. The method of claim 1, wherein the measuring, by the trusted platform control module in combination with the encryption/decryption module, the integrity of the platform or the system comprises:
  determining, by the trusted platform control module, a measurement object to be measured in the platform or the system;
  acquiring, by the trusted platform control module, measurement data of the measurement object, and sending the measurement data of the measurement object to the encryption/decryption module;
  receiving, by the trusted platform control module, a measurement result of the measurement object, according to the measurement data of the measurement result, sent by the encryption/decryption module;
  comparing, by the trusted platform control module, the measurement result of the measurement object with a verification reference value of the measurement object to obtain a comparison result between the measurement result of the measurement object with the verification reference value of the measurement object; and
  determining, by the trusted platform control module, that the measurement object is valid, in response to determining that the comparison result between the measurement result of the measurement object with the verification reference value of the measurement object is consistent.

8. The method of claim 7, wherein the measurement result of the measurement object is obtained by measuring, by the encryption/decryption module, the measurement object according to the measurement data of the measurement object sent by the trusted platform control module.

9. The method of claim 1, wherein the measuring, by the trusted platform control module in combination with the encryption/decryption module, the integrity of the platform or the system, comprises measuring at least one of the following measurement objects:
  a baseboard management controller;
  an input/output system;
  an operating system loader;
  an operating system kernel;
  a virtual trusted platform control module; and
  an application system.

10. One or more computer readable media storing computer-executable instructions that, when executed by one or more processors, cause the one or more processors to perform acts comprising:
  measuring a trusted platform control module after being powered on, the trusted platform control module being hardware module;
  measuring an encryption/decryption module, in response to determining that a measurement of the trusted platform control module is valid, the encryption/decryption module being hardware module, the measuring the encryption/decryption module including:
　　receiving measurement data sent by the encryption/decryption module for measuring the encryption/decryption module;
　　measuring the encryption/decryption module according to the measurement data to obtain a measurement result of the encryption/decryption module;
　　comparing the measurement result of the encryption/decryption module with a verification reference value of the encryption/decryption module; and
　　determining that the encryption/decryption module is valid, in response to determining that a comparison result between the measurement result of the encryption/decryption module and the verification reference value of the encryption/decryption module is consistent; and
measuring an integrity of a platform or a system, in response to determining that a measurement of the encryption/decryption module is valid.

11. The one or more computer readable media of claim 10, wherein the measuring the integrity of the platform or the system comprises:
　determining a measurement object to be measured in the platform or the system;
　receiving a measurement result of the measurement object sent by the encryption/decryption module;
　comparing the measurement result of the measurement object with a verification reference value of the measurement object to obtain a comparison result between the measurement result of the measurement object with a verification reference value of the measurement object; and
　determining that the measurement object is valid, in response to determining that the comparison result between the measurement result of the measurement object with the verification reference value of the measurement object is consistent.

12. The one or more computer readable media of claim 11, wherein the measurement result of the measurement object is obtained by measuring the measurement object according to measurement data of the measurement object after the measurement data of the measurement object is acquired.

13. The one or more computer readable media of claim 10, wherein the measuring the integrity of the platform or the system comprises:
　determining a measurement object of the measurement object to be measured in the platform or the system;
　receiving a comparison result of the measurement object sent by the encryption/decryption module; and
　determining that the measurement object is valid in response to determining that the comparison result of the measurement object is consistent.

14. The one or more computer readable media of claim 10, wherein the measuring the integrity of the platform or the system comprises:
　determining a measurement object to be measured in the platform or the system;
　acquiring measurement data of the measurement object;
　sending the measurement data of the measurement object to the encryption/decryption module;
　receiving a measurement result of the measurement object, according to the measurement data of the measurement result, sent by the encryption/decryption module;
　comparing the measurement result of the measurement object with a verification reference value of the measurement object to obtain a comparison result between the measurement result of the measurement object with the verification reference value of the measurement object; and
　determining that the measurement object is valid, in response to determining that the comparison result between the measurement result of the measurement object with the verification reference value of the measurement object is consistent.

15. The one or more computer readable media of claim 10, wherein the measuring the integrity of the platform or the system comprises measuring at least one of the following measurement objects:
　a baseboard management controller;
　an input/output system;
　an operating system loader;
　an operating system kernel;
　a virtual trusted platform control module; and
　an application system.

16. An apparatus comprising:
　one or more processors; and
　one or more memories storing computer-executable instructions that, when executed by the one or more processors, cause the one or more processors to perform acts comprising: measuring a trusted platform control module after being powered on, the trusted platform control module being hardware module;
measuring an encryption/decryption module, in response to determining that a measurement of the trusted platform control module is valid, the encryption/decryption module being hardware module, the measuring the encryption/decryption module including:
　　receiving measurement data sent by the encryption/decryption module for measuring the encryption/decryption module;
　　measuring the encryption/decryption module according to the measurement data to obtain a measurement result of the encryption/decryption module;
　　comparing the measurement result of the encryption/decryption module with a verification reference value of the encryption/decryption module; and
　　determining that the encryption/decryption module is valid, in response to determining that a comparison result between the measurement result of the encryption/decryption module and the verification reference value of the encryption/decryption module is consistent; and
measuring an integrity of a platform or a system, in response to determining that a measurement of the encryption/decryption module is valid.

17. The apparatus of claim 16, wherein the measuring the integrity of the platform or the system comprises:
　determining a measurement object to be measured in the platform or the system;
　receiving a measurement result of the measurement object sent by the encryption/decryption module;
　comparing the measurement result of the measurement object with a verification reference value of the measurement object to obtain a comparison result between the measurement result of the measurement object with a verification reference value of the measurement object; and
　determining that the measurement object is valid, in response to determining that the comparison result between the measurement result of the measurement object with the verification reference value of the measurement object is consistent.

18. The apparatus of claim 16, wherein the measuring the integrity of the platform or the system comprises:
   determining a measurement object of the measurement object to be measured in the platform or the system;
   receiving a comparison result of the measurement object sent by the encryption/decryption module; and
   determining that the measurement object is valid in response to determining that the comparison result of the measurement object is consistent.

19. The apparatus of claim 16, wherein the measuring the integrity of the platform or the system comprises:
   determining a measurement object to be measured in the platform or the system;
   acquiring measurement data of the measurement object;
   sending the measurement data of the measurement object to the encryption/decryption module;
   receiving a measurement result of the measurement object, according to the measurement data of the measurement result, sent by the encryption/decryption module;
   comparing the measurement result of the measurement object with a verification reference value of the measurement object to obtain a comparison result between the measurement result of the measurement object with the verification reference value of the measurement object; and
   determining that the measurement object is valid, in response to determining that the comparison result between the measurement result of the measurement object with the verification reference value of the measurement object is consistent.

20. The apparatus of claim 16, wherein the measuring the integrity of the platform or the system comprises measuring at least one of the following measurement objects:
   a baseboard management controller;
   an input/output system;
   an operating system loader;
   an operating system kernel;
   a virtual trusted platform control module; and
   an application system.

* * * * *